US007642303B2

(12) United States Patent
Shakely et al.

(10) Patent No.: US 7,642,303 B2
(45) Date of Patent: Jan. 5, 2010

(54) THERMOPLASTIC ARTICLES FOR PACKAGING UV SENSITIVE MATERIALS, PROCESSES FOR THE ARTICLES PRODUCTION AND USE AND NOVEL UV ABSORBERS

(76) Inventors: Thomas L. Shakely, 4785 Merlendale Ct., Atlanta, GA (US) 30327; James John Krutak, 4214 Stonehaven Way, Fredericksburg, VA (US) 22408

(*) Notice: Subject to any disclaimer, the term of this patent is extended or adjusted under 35 U.S.C. 154(b) by 388 days.

(21) Appl. No.: 11/249,891

(22) Filed: Oct. 13, 2005

(65) Prior Publication Data

US 2006/0084732 A1 Apr. 20, 2006

Related U.S. Application Data

(60) Provisional application No. 60/618,959, filed on Oct. 15, 2004.

(51) Int. Cl.
| | |
|---|---|
| C08K 5/34 | (2006.01) |
| C08K 5/3477 | (2006.01) |
| C08K 5/3492 | (2006.01) |
| C08K 5/3435 | (2006.01) |
| C07D 239/02 | (2006.01) |
| C07D 211/00 | (2006.01) |
| C07D 263/12 | (2006.01) |

(52) U.S. Cl. .................. 524/99; 524/100; 524/102; 524/103; 524/104; 524/105; 252/403; 532/1; 544/180; 544/190; 544/211; 544/212; 544/213; 544/215; 544/216; 544/217; 544/218; 544/219; 544/238; 544/239; 544/240; 544/241; 544/295; 544/296; 544/297; 544/298; 544/299; 544/300; 544/301; 544/302; 544/303; 544/309; 544/310; 544/311; 544/315; 544/316; 544/317; 546/184; 546/224; 548/239

(58) Field of Classification Search .................. 252/403; 524/99, 100, 102, 103, 104, 105; 532/1; 544/180, 190, 211, 212, 213, 215–219, 238–241, 544/295, 296.98–303, 309, 310, 311, 315–317; 546/184, 224; 548/239
See application file for complete search history.

(56) References Cited

U.S. PATENT DOCUMENTS

| | | | |
|---|---|---|---|
| 4,093,585 A | 6/1978 | Teige et al. | |
| 4,260,809 A * | 4/1981 | Gruber et al. | .............. 560/138 |
| 4,311,836 A | 1/1982 | Schickfluss | |
| 4,349,607 A | 9/1982 | Ching | |
| 4,359,522 A * | 11/1982 | Postle | .................. 430/512 |
| 4,542,094 A | 9/1985 | Koshizuka et al. | |
| 4,797,435 A | 1/1989 | Scholl et al. | |
| 4,797,493 A | 1/1989 | Matsuno et al. | |
| 4,845,020 A | 7/1989 | Itoh et al. | |
| 4,861,664 A | 8/1989 | Goossens et al. | |
| 4,954,541 A * | 9/1990 | Nakane et al. | ................ 524/86 |
| 4,985,237 A | 1/1991 | Matsuno et al. | |
| 5,000,945 A | 3/1991 | Kobayashi et al. | |
| 5,079,284 A * | 1/1992 | Nakane et al. | ................ 524/97 |
| 5,087,729 A | 2/1992 | Matsuno et al. | |
| 5,166,046 A | 11/1992 | Okusa et al. | |
| 5,320,921 A | 6/1994 | Oshiba et al. | |
| 5,403,691 A | 4/1995 | Oshiba et al. | |
| 5,484,827 A | 1/1996 | Prissok et al. | |
| 5,616,446 A | 4/1997 | Miura et al. | |
| 5,624,786 A | 4/1997 | Hirabayashi et al. | |
| 5,981,076 A | 11/1999 | Ojeda | |
| 6,120,901 A | 9/2000 | Ojeda | |
| 6,157,504 A | 12/2000 | Yamada et al. | |
| 6,207,740 B1 | 3/2001 | Zhao et al. | |
| 6,306,512 B1 | 10/2001 | Bier | |
| 6,380,285 B1 | 4/2002 | Wood et al. | |
| 6,455,032 B1 | 9/2002 | Kelly et al. | |
| 6,508,847 B2 | 1/2003 | Wood et al. | |
| 6,532,120 B1 | 3/2003 | Harada et al. | |
| 6,602,447 B2 | 8/2003 | Danielson et al. | |
| 6,632,783 B1 | 10/2003 | Giblin et al. | |
| 6,677,392 B2 | 1/2004 | Ravichandran et al. | |

\* cited by examiner

*Primary Examiner*—Kriellion A Sanders
(74) *Attorney, Agent, or Firm*—Edward E. Sowers; Brannon & Associates PC

(57) ABSTRACT

Thermoplastic composition and articles containing UV absorbers that protect the articles contents from harmful UV radiation are disclosed as well as methods for making the thermoplastic articles and methods for using the articles to contain and protect materials sensitive to UV radiation. The UV absorbers contain oxazolone and/or azine functional groups that absorb UV radiation and prevent its transmission into the article. Many of the compounds are novel compositions of matter. The generally clear thermoplastic articles of this disclosure are particularly useful for containing a variety of UV sensitive consumer products that would otherwise have to be packaged in opaque containers.

39 Claims, No Drawings

THERMOPLASTIC ARTICLES FOR PACKAGING UV SENSITIVE MATERIALS, PROCESSES FOR THE ARTICLES PRODUCTION AND USE AND NOVEL UV ABSORBERS

CROSS-REFERENCE TO RELATED APPLICATION

The present application claims the benefit of U.S. Provisional Application Ser. No. 60/618,959 filed on Oct. 15, 2004, which is hereby incorporated by reference herein in its entirety.

FIELD OF DISCLOSURE

The present disclosure generally relates to novel UV absorbing compounds having oxazolone and/or azine functionality and polymeric formulations containing the UV absorbers. Polymeric formulations containing low levels of the UV absorbers have reduced UV transmission in the range of 300 to 400 nm.

BACKGROUND

Many food products, cleaning products, medicines and vitamins degrade upon exposure to ultraviolet radiation having a wavelength ranging from about 300 to about 400 nm. Manufacturers traditionally have packaged such products in opaque containers that hide the nature and quantity of the contents. In view of consumers' preference for packaging that reveals the identity, quality and quantity of products, a need exists for transparent articles for packaging that allows the product to be visible without being harmed by UV radiation. Such packaging is preferably derived from currently available thermoplastics containing an effective UV absorber and be manufactured utilizing current extrusion and molding technology. The UV absorber should provide the necessary UV protection, not migrate or otherwise be extracted into the product, not adversely affect the article's appearance and physical properties, not interfere with the article's production and not prevent the thermoplastic from being recycled or otherwise disposed of. The current disclosure addresses these needs.

SUMMARY

Accordingly, in broad terms, one aspect of this disclosure provides for novel thermoplastic articles containing one or more UV absorbers containing oxazolone and/or azine functionality. The oxazolone and azine functionality can be present in a single UV absorber or result from the combination of two separate UV absorbers. UV absorbers having more than one substituted oxazolone group typically have an insulating spacer group incapable of participating in the delocalization of electrons between the two oxazolone groups. For example, compounds having two oxazolone groups connected through their methylene carbon by an aromatic group such as naphthyl or phenyl absorb in the visible region rather than the UV region are reported in U.S. Pat. No. 4,093,585 and function as colorants. Particularly suitable insulating spacer groups can comprise a group, AVB, where A and B are independently an ether, ester, amide, urethane, carbamate, amidine, amino, carbonate or imide group and V can comprise an aliphatic carbon group having from about 2 to about 19 carbons or an aromatic or heteroaromatic group. The novel articles provide reduced transmission of UV radiation across its surface, typically into its interior or other protected region providing protection against UV radiation. The thermoplastic itself and its content both benefit from the incorporation of the novel UV absorbers.

One aspect of this disclosure is a thermoplastic article made from the combination of a thermoplastic combined with a UV absorber capable of protecting its contents from harmful UV radiation. Suitable UV absorbers have oxazolone and/or azine functionality. A further aspect of this disclosure involves new compositions of matter having oxazolone and/or azine functionality that are effective UV absorbers for incorporation into thermoplastic compositions. A still further aspect of this disclosure is a method for protecting a UV sensitive material from harmful UV radiation. Finally, a still further aspect of this disclosure is a process for producing a thermoplastic article resistant to the transmission of UV radiation across its surface.

A preferred embodiment provides for a thermoplastic article, the article having a form and thickness and comprising:

(a) a clear or translucent thermoplastic, and (b) an amount of at least one UV absorbing compound of formulas (I), (II), (III), (IV), (V) or (VI) sufficient to reduce the transmission of ultraviolet radiation into the article,

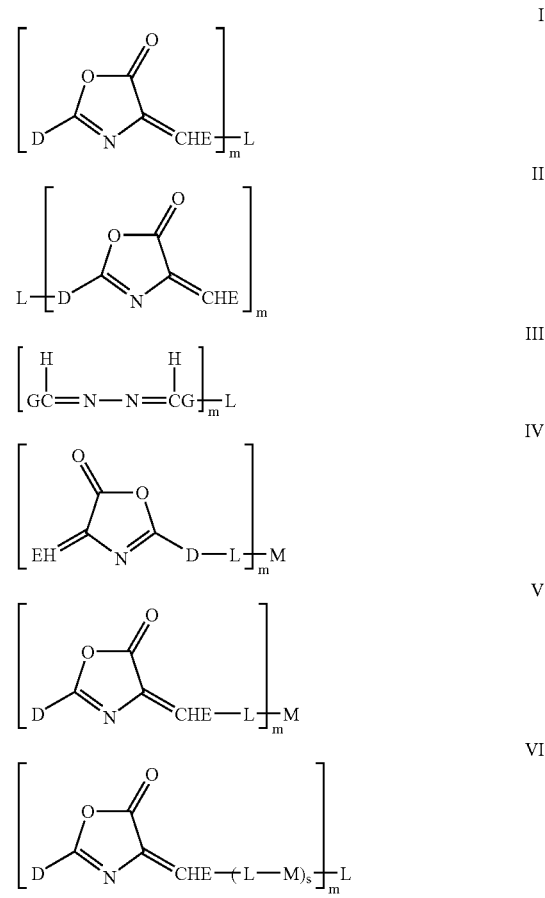

For compounds having the formulas (I), (II), (III), (IV), (V) and (VI),

M is

-GCH=N—N=CHG-;

L is
(a) H, $C_1$-$C_{12}$ alkyl, $(CH_2)_n$OH, COOR, $SO_2$R, $OR^1$, Cl, phenyl, C(W)$R^7$, NHCOR, $NR_2$, phenyl, or imino, provided R is H or $C_1$-$C_{12}$ alkyl, $R^1$ is H or $C_1$-$C_{12}$ alkyl, n is an integer ranging from about 2 to about 8, $R^7$ is $C_1$-$C_{12}$ alkyl, phenyl or phenalkyl and W is O or S;
(b) A, A-V-B, [V-B]$_i$, V where
  (i) A and B are independently

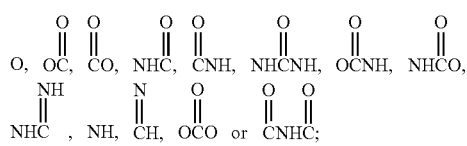

(ii) i is an integer ranging from about 1 to about 6; and
  (iii) V is independently $(CHR^{10})_o$—$U_r$—$(CH_2)_p$ where U is an aliphatic ring containing from 4 to 10 carbons or an aryl group, $R^{10}$ is H or $CH_3$, r is 0 or 1, o is an integer ranging from about 1 to about 9 and p is 0 or an integer ranging from about 1 to about 9; or

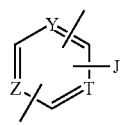

where Z, T and Y are independently carbon or nitrogen and J is OR, Cl, OAc, $NH_2$ or NHR where R is $C_1$-$C_{12}$ alkyl;

D, E and G are independently phenyl, substituted phenyl, naphthyl, substituted naphthyl, thienyl, substituted thienyl, thiazoyl, substituted thiazoyl, thiadiazolyl, substituted thiadiazolyl, oxadiazolyl, substituted oxadiazolyl, pyridyl, substituted pyridyl, quinolyl or substituted quinolyl;

m is 1 or 2; and s is 0 or an integer ranging from about 1 to about 8.

A further embodiment includes novel UV absorbing compounds of formulas (I), (II), (III), (IV), (V) or (VI)

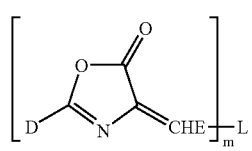  I

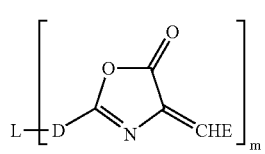  II

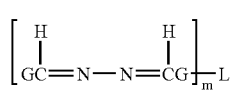  III

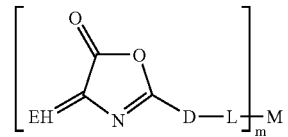  IV

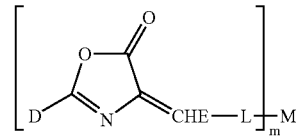  V

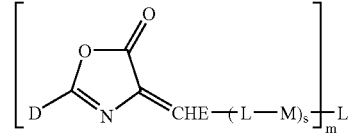  VI

For compounds having the formulas I-VI, M is

-GCH=N—N=CHG-;

D, E and G are independently phenyl, substituted phenyl, naphthyl, substituted naphthyl, thienyl, substituted thienyl, thiazoyl or substituted thiazolyl, thiadiazolyl or substituted thiadiazolyl, oxadiazolyl or substituted oxadiazolyl, pyridyl or substituted pyridyl, quinolyl or substituted quinolyl;

L is
(a) H, $C_1$-$C_{12}$ alkyl, $(CH_2)_n$OH, COOR, $SO_2$R, $OR^1$, Cl, phenyl, C(W)$R^7$, NHCOR, $NR_2$, phenyl, or imino, provided R is H or $C_1$-$C_{12}$ alkyl, $R^1$ is H or $C_1$-$C_{12}$ alkyl, n is an integer ranging from about 2 to about 8, $R^7$ is $C_1$-$C_{12}$ alkyl, phenyl or phenalkyl and W is O or S;
(b) A, A-V-B, [V-B]$_i$, V where
  (i) A and B are independently

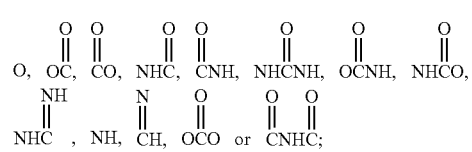

(ii) i is an integer ranging from about 1 to about 6; and
  (iii) V is independently $(CHR^{10})_o$—$U_r$—$(CH_2)_p$ where U is an aliphatic ring containing from 4 to 10 carbons or an aryl group, $R^{10}$ is H or $CH_3$, r is 0 or 1, o is an integer ranging from about 1 to about 9 and p is 0 or an integer ranging from about 1 to about 9; or

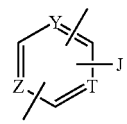

where Z, T and Y are independently carbon or nitrogen and J is OR, Cl, OAc, $NH_2$ or NHR where R is $C_1$-$C_{12}$ alkyl;

s is 0 or an integer ranging from about 1 to about 8; and m is 2.

A further embodiment is a method for protecting a material from UV radiation. The method comprises selecting a material to protect from UV radiation, selecting a thermoplastic article formed from the combination of a thermoplastic and at least one compound of formulas (I), (II), (III), (IV), (V) or (VI) described above, and containing the material to be protected within the thermoplastic article. Suitable thermoplastics for preparing applicant's thermoplastic articles include, but are not limited to polystyrenes, polyesters, polyamides, polyesteramides, polymethacrylates, polyolefins, polycarbonates, acrylonitrile-butadiene styrenes, and acrylics. Preferred thermoplastics for preparing the thermoplastic articles include polyesters.

A still further embodiment is a process for producing a thermoplastic article that protect its contents from UV radiation, the process involving selecting one or more UV absorbers of formulas (I), (II), (III), (IV), (V) and (VI) described above, selecting at least one thermoplastic, combining the selected UV absorbers and the selected one or more thermoplastics, treating the resulting combination to cause the mixture to flow and be capable of assuming a shape and forming an article having a desired shape from the treated combination. The combination can be caused to flow either by heating the combination to a temperature near or above its softening point or by dissolving the combination in a suitable solvent. Solvents for different thermoplastics are known to those skilled in the art and appropriate solvents for the combination can be readily determined without undue effort. Thermoplastic articles according to the current disclosure can be prepared from polystyrenes, polyesters, polyamides, polyesteramides, polymethacrylates, polyolefins, polycarbonates, acrylonitrile-butadiene styrenes, acrylics and other thermoplastics. The level of UV absorber needed is a function of its effectiveness and the thickness of the articles surface. Generally a lower level of UV absorber is needed for articles having a thicker wall or surface. The appropriate level of UV absorber needed for a particular application can be determined by one skilled in the art without undue effort.

Thermoplastic articles containing the UV absorbers described above are generally translucent or clear, protect their contents from harmful UV radiation, do not release UV absorbers into their contents or environment, can be manufactured by standard methods, and can be recycled or disposed of by conventional means. Although colorants can be added if desired, they should not be of a type or amount to cause the article to become opaque.

Related objects and advantages of the present disclosure to those already stated above will be apparent from the following description.

DESCRIPTION

For the purposes of promoting an understanding of the principles of the invention reference will now be made to the embodiments illustrated and specific language will be used to describe the same. It will nevertheless be understood that no limitation of the scope of the invention is thereby intended, such alterations and further modifications and such further applications of the principles of the invention as illustrated therein being contemplated as would normally occur to one skilled in the art to which the invention relates.

One aspect of the present disclosure includes novel thermoplastic articles containing at least one UV absorbers having oxazolone and/or azine functionality that absorb UV radiation and therefore limit the transmission of harmful UV radiation having a wavelength of between about 300 to about 400 nm into or through the article. The UV absorbance of the substituted oxazolone system is generally between about 350 and about 400 nm depending on the aromatic substituents present. The UV absorbance of the substituted azine system is generally between about 300 and about 350 nm, similarly depending on the nature of its substituents. UV protection for a narrow or broad range of radiation can be obtained by selecting the suitable oxazolone and/or azine UV absorber. Preferred articles have at least a two-dimensional form and include but are not limited to bottles, jars, jugs, vials, cartons, bags, bubble packs, sheets and ribbons.

A further aspect of this disclosure is a process or making the novel thermoplastic articles containing the oxazolone and/or azine UV absorbers. Finally, the UV absorbers having at least two oxazolone groups, at least two azine groups or a combination of at least one oxazolone and at least one azine group are new compositions of matter that can be formulated into thermoplastic articles and exhibit the ability to absorb UV radiation.

The term thermoplastic is intended to encompass homopolymers and copolymers and includes but is not limited to such polymeric materials as polyolefins, polyesters, polyamides, polyurethanes, and polycarbonates. Examples of polyolefins include but are not limited to such polymeric materials as polystyrenes, polypropylenes, polyethylenes, polysulfones, and acrylonitrile-butadiene styrenes.

UV Absorbers Based on Oxazolones

Suitable substituted oxazolone UV absorbers can be made by a variety of reactions including the reaction of appropriately substituted amidoacetic acids and appropriately substituted aldehydes.

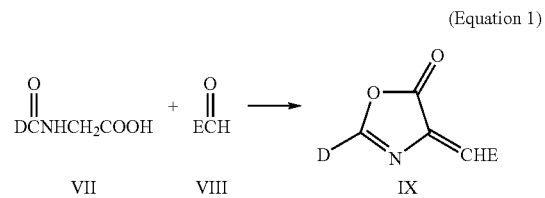

(Equation 1)

D and E can be a substituted or unsubstituted aromatic or heteroaromatic rings such as phenyl, naphthyl, thienyl, and thiazolyl, thiadiazolyl, oxadiazolyl, pyridyl and quinolyl. Additionally, if D or E have more than one amidoacetic acid group or aldehyde group attached through an L member, two or more substituted oxazolone groups are linked together through the L member.

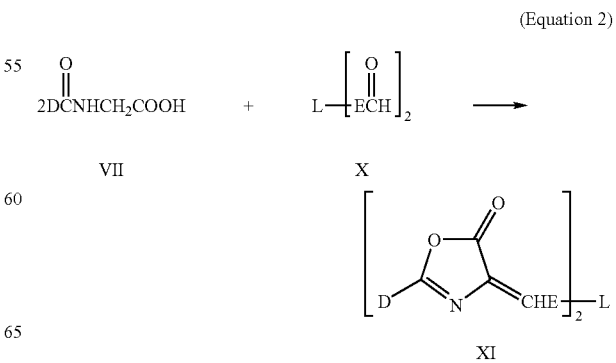

(Equation 2)

-continued (Equation 3)

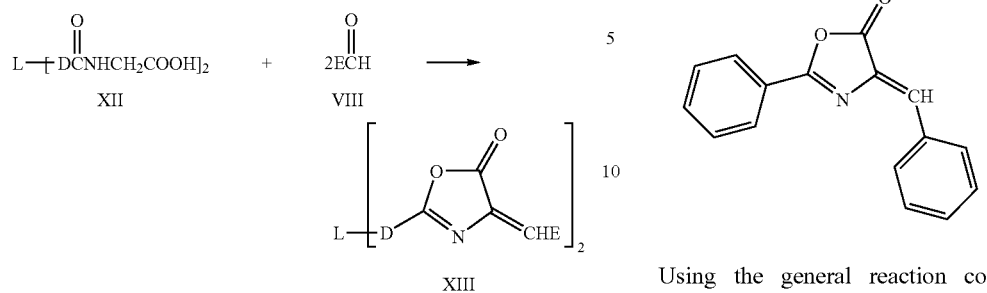

Although the equations above show the oxazolone ring being formed simultaneously with the linking step, the cyclic azalactone can also be formed in a first step and subsequently linked provided the substituted amidoacetic acid or aldehyde used to form the substituted oxazolone contains a functional group capable of forming a linking bond. Preferred linking groups L can be represented by the formula A, A-V-B, [V-B]$_i$ or V where the functional groups A and B provide a linking bond with the UV absorbing portion of the molecule and the spacer group V connects A and B. A and B can be the same or different whereas preferred V structures are aliphatic in nature while i is an integer ranging from about 1 to about 6. Preferred functional groups A and B include, but are not limited to ethers, esters, amides, imides, urethanes, carbamates, amidines, amines and carbonates.

EXAMPLE 1

5(4H)-Oxazolone, 2-phenyl-4-(phenylmethylene)-

Benzaldehyde (198.6 g), acetic anhydride (382 g), hippuric acid (335.4 g) and sodium acetate (153 g) were combined in 1370 g of mixed xylenes with good stirring. With continued stirring the mixture was purged with nitrogen and heated under nitrogen to 95° C. and maintained at this temperature for 3 hours. With continued stirring about 400 g of hot water was added to the hot reaction mixture. Stirring was stopped and the layers allowed to separate. The water layer was removed and the remaining organic layer similarly washed with a second 400 g portion of hot water. The resulting organic layer was allowed to cool to effect crystallization of the product. The resulting slurry was filtered with the aid of a vacuum, washed with about 600 g of isopropanol in three portions and the wet solid (1) dried to a constant weight of 375 g in a drying oven at about 115° C.

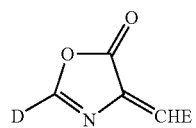

Using the general reaction conditions described in Example 1, compounds of formula I (where m=1 and L=H) are prepared according to Equation 1 as illustrated in Examples 2-136, which follow.

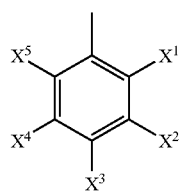

EXAMPLES 2-31

Using the general reaction conditions described in Example 1, compounds of formula I (where m=1 and L=H) are prepared according to Equation 1 as illustrated in Examples 2-31, where D is

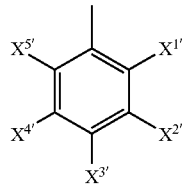

and E is

| EXAMPLE | $X^1$ | $X^2$ | $X^3$ | $X^4$ | $X^5$ | $X^{1'}$ | $X^{2'}$ | $X^{3'}$ | $X^{4'}$ | $X^{5'}$ |
|---|---|---|---|---|---|---|---|---|---|---|
| 2 | H | R | H | H | H | H | R | H | H | H |
| 3 | R | H | H | H | H | R | H | H | H | H |
| 4 | H | H | R | H | H | H | H | R | H | H |
| 5 | H | COOR | H | H | H | H | COOR | H | H | H |
| 6 | H | COOR | H | COOR | H | H | H | H | H | H |
| 7 | H | H | H | H | H | H | COOR | H | H | H |
| 8 | H | SO$_2$NHR | H | H | H | H | H | H | H | H |
| 9 | H | H | H | H | H | H | SO$_2$NHR | H | H | H |

-continued

| EXAMPLE | $X^1$ | $X^2$ | $X^3$ | $X^4$ | $X^5$ | $X^{1'}$ | $X^{2'}$ | $X^{3'}$ | $X^{4'}$ | $X^{5'}$ |
|---|---|---|---|---|---|---|---|---|---|---|
| 10 | H | $SO_2NHR$ | H | H | H | H | $SO_2NHR$ | H | H | H |
| 11 | H | $SO_2R$ | H | H | H | H | H | H | H | H |
| 12 | H | H | H | H | H | H | $SO_2R$ | H | H | H |
| 13 | H | $SO_2R$ | H | H | H | H | $SO_2R$ | H | H | H |
| 14 | H | H | OR | H | H | H | H | H | H | H |
| 15 | H | H | H | H | H | H | H | OR | H | H |
| 16 | H | H | OR | H | H | H | H | OR | H | H |
| 17 | H | H | COOR | H | H | H | H | H | H | H |
| 18 | H | H | H | H | H | H | H | COOR | H | H |
| 19 | H | H | COOR | H | H | H | H | COOR | H | H |
| 20 | H | H | $SO_2R$ | H | H | H | H | H | H | H |
| 21 | H | H | H | H | H | H | H | $SO_2R$ | H | H |
| 22 | H | H | $SO_2R$ | H | H | H | H | $SO_2R$ | H | H |
| 23 | H | H | Cl | H | H | H | H | H | H | H |
| 24 | H | H | H | H | H | H | H | Cl | H | H |
| 25 | H | H | Cl | H | H | H | H | Cl | H | H |
| 26 | H | H | Phenyl | H | H | H | H | H | H | H |
| 27 | H | H | H | H | H | H | H | phenyl | H | H |
| 28 | H | H | COR | H | H | H | H | H | H | H |
| 29 | H | H | COR | H | H | H | H | COR | H | H |
| 30 | H | H | COphenyl | H | H | H | H | H | H | H |
| 31 | H | H | H | H | H | H | H | COphenyl | H | H |

EXAMPLES 32-42

Using the general reaction conditions described in Example 1, compounds of formula I (where m=1 and L=H) are prepared according to Equation 1 as illustrated in examples 32-42, where D is

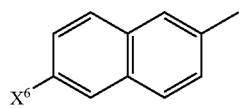

and E is

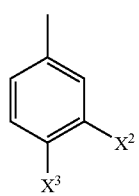

| EXAMPLE | $X^2$ | $X^3$ | $X^6$ |
|---|---|---|---|
| 32 | H | H | H |
| 33 | H | COOR | COOR |
| 34 | H | $SO_2R$ | COOR |
| 35 | H | $SO_2NHR$ | COOR |
| 36 | OR | H | H |
| 37 | OR | OR | H |
| 38 | OR | $SO_2R$ | H |
| 39 | COOR | H | H |
| 40 | COOR | COOR | H |
| 41 | COOR | $SO_2R$ | H |
| 42 | COOR | $SO_2NHR$ | H |

EXAMPLES 43-46

Using the general reaction conditions described in Example 1, compounds of formula I (where m=1 and L=H) are prepared according to Equation 1 as illustrated in examples 43-46, where D is

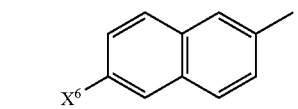

and E is

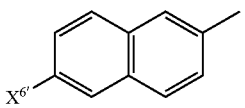

| EXAMPLE | $X^6$ | $X^{6'}$ |
|---|---|---|
| 43 | H | H |
| 44 | COOR | H |
| 45 | COOR | COOR |
| 46 | H | COOR |

EXAMPLES 47-50

Using the general reaction conditions described in Example 1, compounds of formula I (where m=1 and L=H) are prepared according to Equation 1 as illustrated in examples 47-50, where D is

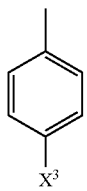

and E is

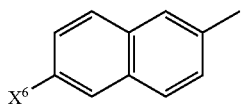

| EXAMPLE | $X^3$ | $X^6$ |
|---|---|---|
| 47 | H | H |
| 48 | COOR | H |
| 49 | H | COOR |
| 50 | COOR | COOR |

EXAMPLES 51-58

Using the general reaction conditions described in Example 1, compounds of formula I (where m=1 and L=H) are prepared according to Equation 1 as illustrated in examples 51-58, where D is

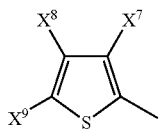

and E is

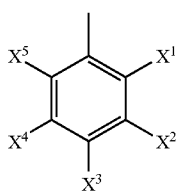

| EXAMPLE | $X^7$ | $X^8$ | $X^9$ | $X^1$ | $X^2$ | $X^3$ | $X^4$ | $X^5$ |
|---|---|---|---|---|---|---|---|---|
| 51 | H | H | R | H | H | H | H | H |
| 52 | H | H | H | H | H | H | H | H |
| 53 | H | H | Cl | H | H | H | H | H |
| 54 | H | H | OR | H | H | H | H | H |
| 55 | H | H | NHCOR | H | H | H | H | H |
| 56 | H | H | $NH_2$ | H | H | H | H | H |

-continued

| EXAMPLE | $X^7$ | $X^8$ | $X^9$ | $X^1$ | $X^2$ | $X^3$ | $X^4$ | $X^5$ |
|---|---|---|---|---|---|---|---|---|
| 57 | H | COOR | NHCOR | H | H | H | H | H |
| 58 | $CH_3$ | COOR | NHCOR | H | H | H | H | H |

EXAMPLES 59-66

Using the general reaction conditions described in Example 1, compounds of formula I (where m=1 and L=H) are prepared according to Equation 1 as illustrated in examples 59-66, where D is

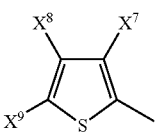

and E is

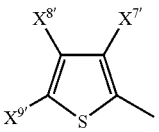

| EXAMPLE | $X^7$ | $X^8$ | $X^9$ | $X^{7'}$ | $X^{8'}$ | $X^{9'}$ |
|---|---|---|---|---|---|---|
| 59 | H | H | R | H | H | H |
| 60 | H | H | H | H | H | H |
| 61 | H | H | Cl | H | H | H |
| 62 | H | H | OR | H | H | H |
| 63 | H | H | NHCOR | H | H | NHCOR |
| 64 | H | H | H | H | COOR | NHCOR |
| 65 | H | H | H | $CH_3$ | COOR | NHCOR |
| 66 | H | H | R | H | H | OR |

EXAMPLES 67-71

Using the general reaction conditions described in Example 1, compounds of formula I (where m=1 and L=H) are prepared according to Equation 1 as illustrated in examples 67-71, where D is

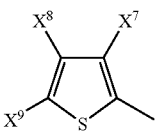
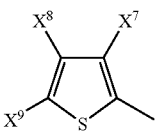

and E is

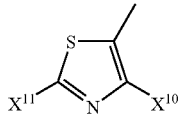

| EXAMPLE | $X^7$ | $X^8$ | $X^9$ | $X^{10}$ | $X^{11}$ |
|---|---|---|---|---|---|
| 67 | H | H | H | H | H |
| 68 | H | H | H | $CH_3$ | $NHCOCH_3$ |
| 69 | H | H | H | phenyl | $NHCOCH_3$ |
| 70 | H | H | H | H | $NHCOCH_3$ |
| 71 | H | H | H | octyl | $NHCOCH_3$ |

EXAMPLES 72-76

Using the general reaction conditions described in Example 1, compounds of formula I (where m=1 and L=H) are prepared according to Equation 1 as illustrated in examples 72-76, where D is

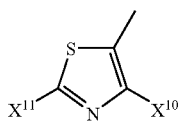

and E is

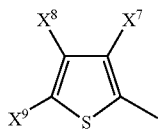

| EXAMPLE | $X^{10}$ | $X^{11}$ | $X^7$ | $X^8$ | $X^9$ |
|---|---|---|---|---|---|
| 72 | H | H | H | H | H |
| 73 | Butyl | $NHCOC_2H_5$ | H | H | H |
| 74 | Phenyl | $NHCOC_4H_9$ | H | H | H |
| 75 | H | $NHCOC_{12}H_{25}$ | H | H | H |
| 76 | Decyl | $NHCOCH_3$ | H | H | H |

EXAMPLES 77-80

Using the general reaction conditions described in Example 1, compounds of formula I (where m=1 and L=H) are prepared according to Equation 1 as illustrated in examples 75-77, where D is

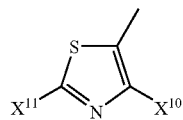

and E is

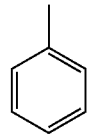

| EXAMPLE | $X^{10}$ | $X^{11}$ |
|---|---|---|
| 77 | H | H |
| 78 | $C_4H_9$ | $NHCOC_{12}H_{25}$ |
| 79 | H | $NHCOCH_3$ |
| 80 | Phenyl | $NHCOC_4H_9$ |

EXAMPLES 81-84

Using the general reaction conditions described in Example 1, compounds of formula I (where m=1 and L=H) are prepared according to Equation 1 as illustrated in examples 85-92, where D is

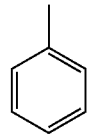

and E is

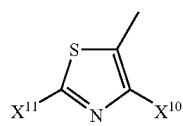

| EXAMPLE | $X^{10}$ | $X^{11}$ |
|---|---|---|
| 81 | H | H |
| 82 | $C_4H_9$ | $NHCOC_{12}H_{25}$ |
| 83 | H | $NHCOCH_3$ |
| 84 | Phenyl | $NHCOC_4H_9$ |

EXAMPLES 85-92

Using the general reaction conditions described in Example 1, compounds of formula I (where m=1 and L=H) are prepared according to Equation 1 as illustrated in examples 85-92, where D is

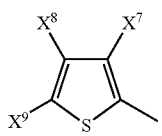

and E is

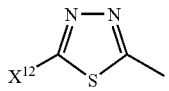

| EXAMPLE | X$^{12}$ | X$^7$ | X$^8$ | X$^9$ |
|---------|----------|-------|-------|-------|
| 85 | H | H | H | R |
| 86 | C$_4$H$_9$ | H | H | H |
| 87 | COOC$_{10}$H$_{21}$ | H | H | Cl |
| 88 | Phenyl | H | H | OR |
| 89 | OC$_2$H$_5$ | H | H | NHCOR |
| 90 | NHCOCH$_3$ | H | H | NH$_2$ |
| 91 | NH$_2$ | H | COOR | NHCOR |
| 92 | NEt$_2$ | CH$_3$ | COOR | NHCOR |

EXAMPLES 93-100

Using the general reaction conditions described in Example 1, compounds of formula I (where m=1 and L=H) are prepared according to Equation 1 as illustrated in examples 93-100, where D is

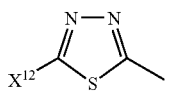

and E is

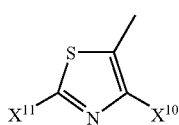

| EXAMPLE | X$^{10}$ | X$^{11}$ | X$^{12}$ |
|---------|----------|----------|----------|
| 93 | CH$_3$ | NHCOC$_2$H$_5$ | H |
| 94 | Phenyl | NHCOC$_4$H$_9$ | C$_5$H$_{11}$ |
| 95 | H | NHCOC$_2$H$_5$ | COOEt |
| 96 | Decyl | NHCOC$_5$H$_{11}$ | OC$_3$H$_7$ |
| 97 | H | NHCOC$_3$H$_7$ | NHCOR |
| 98 | H | NHCOC$_{12}$H$_{25}$ | NH$_2$ |
| 99 | H | NHCOCH$_3$ | Phenyl |
| 100 | CH$_3$ | NHCOCH$_3$ | NEt$_2$ |

EXAMPLES 101-108

Using the general reaction conditions described in Example 1, compounds of formula I (where m=1 and L=H) are prepared according to Equation 1 as illustrated in examples 101-108, where D is

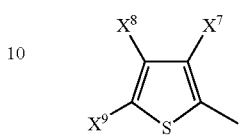

and E is

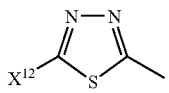

| EXAMPLE | X$^7$ | X$^8$ | X$^9$ | X$^{12}$ |
|---------|-------|-------|-------|----------|
| 101 | H | H | R | H |
| 102 | H | H | H | C$_4$H$_9$ |
| 103 | H | H | Cl | COOC$_{10}$H$_{21}$ |
| 104 | H | H | OR | Phenyl |
| 105 | H | H | NHCOR | OC$_2$H$_5$ |
| 106 | H | H | NH$_2$ | NHCOCH$_3$ |
| 107 | H | COOR | NHCOR | NH$_2$ |
| 108 | CH$_3$ | COOR | NHCOR | NEt$_2$ |

EXAMPLES 109-116

Using the general reaction conditions described in Example 1, compounds of formula I (where m=1 and L=H) are prepared according to Equation 1 as illustrated in examples 109-116, where D is

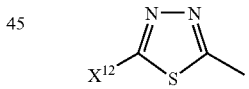

and E is

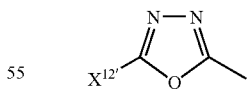

| EXAMPLE | X$^{12}$ | X$^{12'}$ |
|---------|----------|-----------|
| 109 | NEt$_2$ | H |
| 110 | NH$_2$ | C$_4$H$_9$ |
| 111 | NHCOCH$_3$ | COOC$_{10}$H$_{21}$ |
| 112 | OC$_2$H$_5$ | Phenyl |
| 113 | Phenyl | OC$_2$H$_5$ |
| 114 | COOC$_{10}$H$_{21}$ | NHCOCH$_3$ |

-continued

| EXAMPLE | $X^{12}$ | $X^{12'}$ |
|---|---|---|
| 115 | $C_4H_9$ | $NH_2$ |
| 116 | H | $NEt_2$ |

EXAMPLES 117-125

Using the general reaction conditions described in Example 1, compounds of formula I (where m=1 and L=H) are prepared according to Equation 1 as illustrated in examples 117-125, where D is

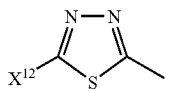

$X^{12}$ is H, $CH_3$, $C_{10}H_{21}$, COOEt, phenyl, $OC_6H_{13}$, NHCOEt, $NH_2$, $N(CH_3)_2$, and E is 2-pyridyl.

EXAMPLE 126

Using the general reaction conditions described in Example 1, a compound of formula I (where m=1 and L=H) is prepared according to Equation 1 as illustrated in example 126, where D is phenyl and E is 2-pyridyl.

EXAMPLE 127

Using the general reaction conditions described in Example 1, a compound of formula I (where m=1 and L=H) is prepared according to Equation 1 as illustrated in example 127, where D is 4-pyridyl and E is 4-pyridyl.

EXAMPLES 128-135

Using the general reaction conditions described in Example 1, compounds of formula I (where m=1 and L=H) are prepared according to Equation 1 as illustrated in examples 128-135, where D is

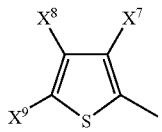

and E is 4-pyridyl.

| EXAMPLE | $X^7$ | $X^8$ | $X^9$ |
|---|---|---|---|
| 128 | H | H | R |
| 129 | H | H | H |
| 130 | H | H | Cl |
| 131 | H | H | OR |
| 132 | H | H | NHCOR |
| 133 | H | COOR | NHCOR |
| 134 | $CH_3$ | COOR | NHCOR |
| 135 | H | H | OR |

EXAMPLES 136

Using the general reaction conditions described in Example 1, a compound of formula I (where m=1 and L=H) is prepared according to Equation 1 as illustrated in example 136, where D is 4-pyridyl and E is phenyl.

UV absorbers can also be constructed with two or more substituted oxazolone groups shown in formula I linked through either ring substituent. The reaction of 2 moles of hippuric acid, an aroyl amidoacetic acid, or a heteroaroyl amidoacetic acid with one mole of a dialdehyde according to method described in Example I gives compounds having the structure of formula I (where m=2).

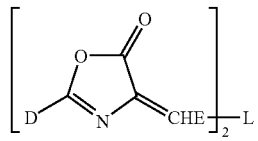

XI

Suitable dialdehyde linking compounds can be prepared by attaching a substituted carboxyaldehyde such as a hydroxyaldehyde to a diol through ester, amide, urethane, carbamate, ether, or other linkages. The well know methods for making esters, ethers and other linkages are suitable for making linking groups OHCE-L-ECHO having the following structures where n is an integer from about 1 to about 6:

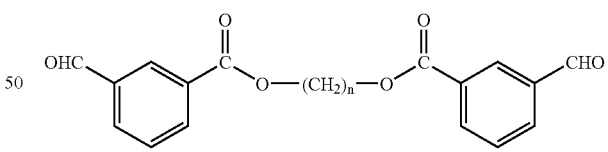

Dialdehyde A

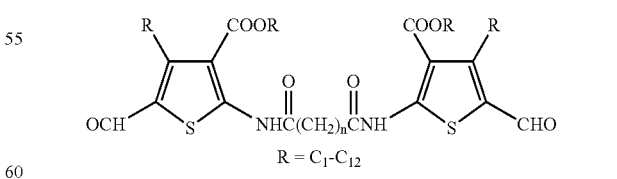

Dialdehyde B

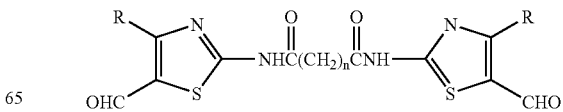

Dialdehyde C

-continued

Dialdehyde D
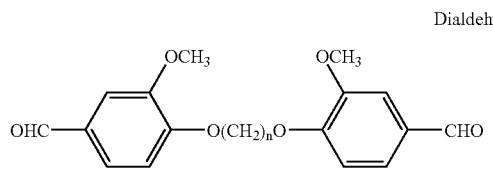

Dialdehyde E
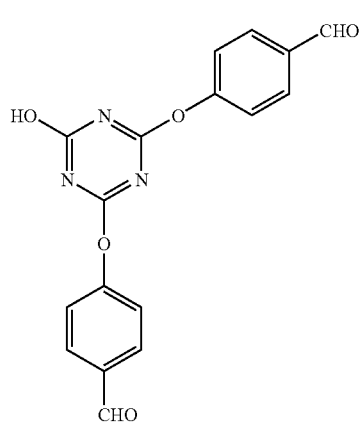

Dialdehyde F
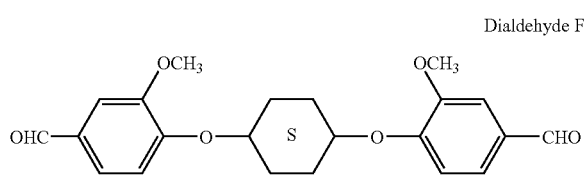

-continued

Dialdehyde G
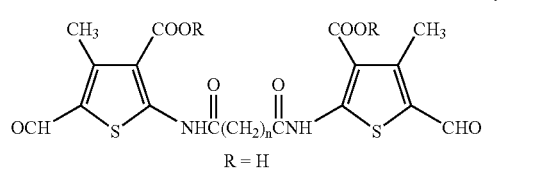
R = H

Dialdehyde H
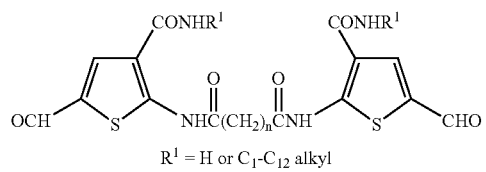
$R^1$ = H or $C_1$-$C_{12}$ alkyl

EXAMPLE 137

4-Hydroxybenzaldehyde (12.2 g) was dissolved in 300 g of mixed xylenes and heated with stirring to 30 to 35° C. With continued stirring toluene diisocyanate (8.7 g) was added to the reaction mixture dropwise. When all of the diisocyanate had been added the reaction mixture was heated to 120° C. and maintained at that temperature for about two hours. The reaction mixture was cooled to 50° C. and acetic hydride (22 g), sodium acetate (8.2 g) and hippuric acid (17.9 g) were added with continued stirring. The reaction mixture was heated to 100° C. and maintained at that temperature for two hours and allowed to cool. The solid that had formed was filtered, re-slurried in 300 g of isopropanol and water, filtered again and dried to give 18 g of a pale yellow solid (2). A portion of the solid was molded in polystyrene and the resulting polymer exhibited a strong absorption from 300 to 400 nm while negligibly impacting the color of the polystyrene.

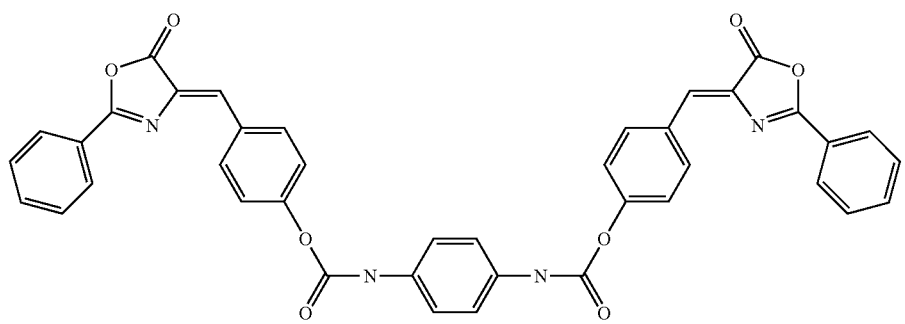
(2)

EXAMPLES 138-152

Using the general reaction conditions described in Example 1, compounds of formula I (where m=1) is prepared according to Equation 2 as illustrated in examples 138-152 where two moles of the amidoacetic acid is reacted with one mole of the dialdehyde. The amidoacetic acid in examples 137-151 is represented by the formula:

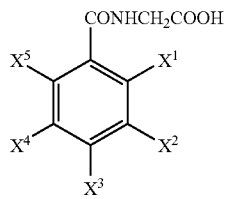

and aldehydes selected from Aldehydes I through VIII illustrated above.

| EXAMPLE | $X^1$ | $X^2$ | $X^3$ | $X^4$ | $X^5$ | DIALDEHYDE |
|---|---|---|---|---|---|---|
| 138 | H | H | H | H | H | A (n = 2) |
| 139 | H | R | H | H | H | H (n = 2) |
| 140 | R | H | H | H | H | B (n = 4) |
| 141 | H | H | R | H | H | B (n = 6) |
| 142 | H | COOR | H | H | H | CI (n = 2) |
| 143 | H | COOR | H | COOR | H | D (n = 2) |
| 144 | H | SO$_2$NHR | H | H | H | F |
| 145 | H | SO$_2$R | H | H | H | E |
| 146 | H | H | OR | H | H | D (n = 6) |
| 147 | H | H | COOR | H | H | C (n = 2) |
| 148 | H | H | SO$_2$R | H | H | A (n = 4) |
| 149 | H | H | Cl | H | H | D (n = 2) |
| 150 | H | H | Phenyl | H | H | E |
| 151 | H | H | COR | H | H | D (n = 3) |
| 152 | H | H | Cophenyl | H | H | G (n = 6) |

When subjected to the reaction conditions of Example 1, dialdehydes G and H (R=H) react with hippuric acid or related amidoacetic acids to form an oxazolone and an additional cyclic structure in the dialdehyde portion of the molecule. For example one mole of dialdehyde G reacts with two moles of hippuric acid to form the following compound:

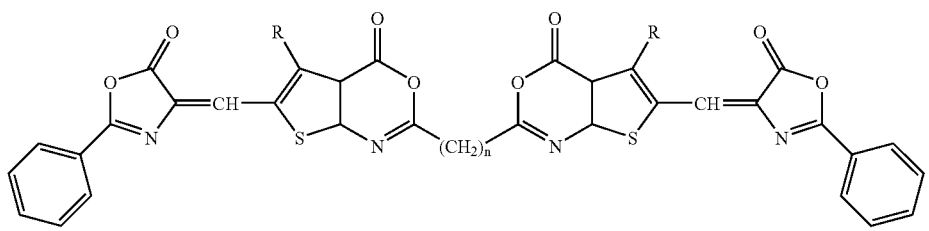

XIV

Similarly one mole of dialdehyde H(R=H) reacts with two moles of hippuric acid to form the following compound:

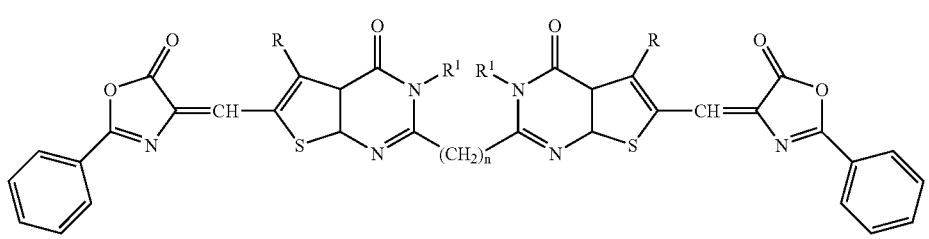

XV

In these two examples, E is a substituted thiophene linked through an amidine or carbamate group which is part of a second ring formed by an edge of the thiophene ring.

EXAMPLE 153

Two moles of the product from Example 17 where R is H are reacted under reflux conditions with one mole of ethylene glycol and a catalytic amount of p-TsOH in xylene. Water produced during the esterification is removed in a Dean Stark collector. After the esterification reaction is complete the catalyst is extracted with a small quantity of a dilute aqueous solution of sodium carbonate. The organic layer is dried and the product isolated using standard techniques from the hydrocarbon solvent. The product has the structure of formula II where D and E are phenyl, m=2, and L has the structure provided below:

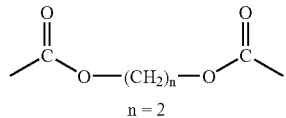

n = 2

XVI

Similar linked oxazolones can be obtained by using diols having up to about 8 carbons.

EXAMPLE 154

4-Amino-hippuric acid (19.4 g) and terephthaldehyde, (6.7 g) were combined in 75 g of mixed xylenes and 15 g of N-methylpyrrolidone with agitation and heated to reflux. Water generated was removed as formed in a Dean Stark trap. After about 6 hours, water evolution stopped and the reaction mixture was cooled to about 50° C. An additional 50 g of mixed xylenes were added to facilitate mixing, acetic anhy dride (20.4 g) and benzaldehyde (11.2 g) and sodium acetate (8.2 g) were added and the resulting reaction mixture heated with stirring at 100° C. for 16 hours. The reaction mixture was cooled. The solid (3) that had formed was removed by filtration, washed with isopropanol and dried. The resulting solid (7.8 g) did not melt when heated to 340° C. and had a broad UV absorption in acetonitrile of from 320 to 480 nm with the maximum absorption at 388 nm.

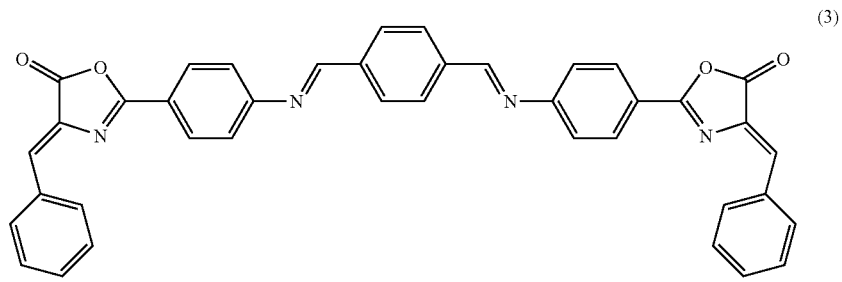

(3)

EXAMPLE 155

Mixed xylenes (300 g) and 12.2 g of 4-hydroxybenzaldehyde were added to a 1 liter flask and with stirring the mixture heated to 45° C. With continued stirring 8.7 g of toluene diisocyanate was added over about 10 minutes. The reaction mixture was then heated to 100° C. and maintained at this temperature for one hour. Heating was discontinued and the reaction mixture allowed to cool to about 50° C. Sodium Acetate (8.2 g), acetic anhydride (20.4 g) and hippuric acid (17.9 g) were added to the reaction mixture and the reactants heated with stirring to 100° C. and maintained at that temperature for one hour. The reaction mixture was cooled to 20° C. and the resulting solid filtered. The wet filter cake was slurried with hot water and again filtered to remove salts. The resulting solid (4) was dried to a constant weight to give 22.2 g of yellow crystals having the formula:

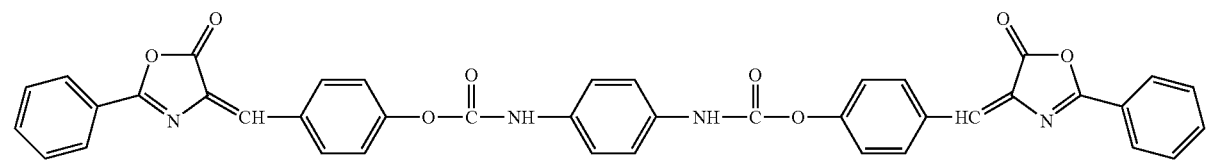

(4)

The UV absorbers prepared in experiments 1-155 absorb UV radiation between 300 and 400 nm, neither migrate nor are extracted by liquids in contact with the thermoplastic article, are generally colorless at the levels utilized and do not adversely affect the articles physical properties or appearance. Because of their structure and because the UV absorbers are effective at very low concentrations, they do not interfere with recycling or disposal of a thermoplastic article having a UV absorber incorporated.

UV Absorbers Based on Azines

Azines or hydrazones having formula (III) (where m=1 and L=H) suitable for use as UV absorbers can be prepared by the reaction of an appropriately substituted aldehyde with hydrazine as illustrated below.

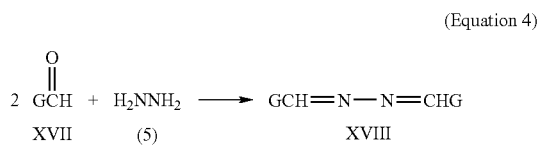

(Equation 4)

G can be, but is not limited to, substituted or unsubstituted aromatic or heteroaromatic rings such as phenyl, naphthyl, thienyl, thiazoyl, thiadiazolyl, oxadiazolyl, pyridyl, quinolyl and the like.

The aldehydes can be the same as illustrated above or different as illustrated below where the aldehydes are added sequentially.

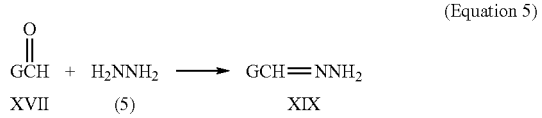

(Equation 5)

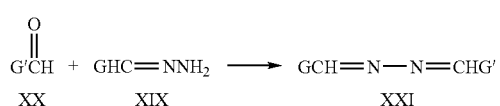

(Equation 6)

Finally, azine UV absorbers having more than one azine unit result from the initial reaction of a dialdehyde OHCLCHO with an excess of hydrazine followed by a subsequent reaction with another aldehyde GCHO.

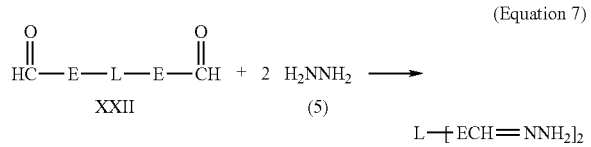

(Equation 7)

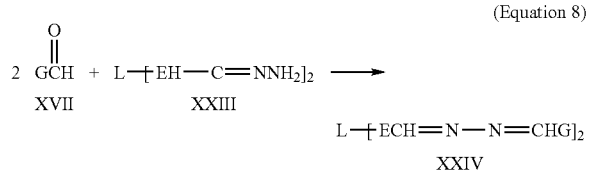

(Equation 8)

As with the oxazolone UV absorbers, L can be:

(a) H, $C_1$-$C_{12}$ alkyl, $(CH_2)_n$OH, COOR, $SO_2R$, $OR^1$, Cl, phenyl, $C(W)R^7$, NHCOR, $NR_2$, phenyl, provided R is H or $C_1$-$C_{12}$ alkyl, $R^1$ is H or $C_1$-$C_{12}$ alkyl, n is an integer ranging from about 2 to about 8, $R^7$ is $C_1$-$C_{12}$ alkyl, phenyl or phenalkyl and W is O or S;

(b) A-V-B, $[V-B]_i$, V where (i) A and B are independently

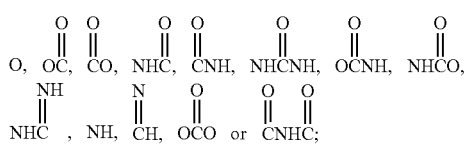

(ii) i is an integer ranging from about 1 to about 6; and (iii) V is independently $(CHR^{10})_o$—$U_r$—$(CH_2)_p$ where U is an aliphatic ring containing from 4 to 10 carbons or an aryl group, $R^{10}$ is H or $CH_3$, r is 0 or 1, o is an integer ranging from about 1 to about 9 and p is 0 or an integer ranging from about 1 to about 9; or

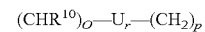

where Z, T and Y are independently carbon or nitrogen and J is OR, Cl, OAc, $NH_2$ or NHR where R is $C_1$-$C_{12}$ alkyl; and m is 2.

A and B can be the same or different whereas preferred V's are generally aliphatic in nature. Preferred functional groups A and B include, but are not limited to ethers, esters, amides, imides, urethanes, carbamates, amidines, amines and carbonates.

EXAMPLE 156

Benzaldehyde, 3,4-dimethoxy-, [3,4-dimethoxyphenyl)methylene]hydrazone

A mixture of 150 g (0.90 mole) of 3,4-dimethoxybenzaldehyde and 22.6 g (0.45 mole) of hydrazine hydrate in 250 g of isopropanol was heated to reflux with stirring for about 3 hours. The reaction mixture was cooled, the crystalline product isolated by vacuum filtration, washed with a small quantity of isopropanol and dried at about 115° C. to give 146.9 g of the hydrazone (6).

(6)

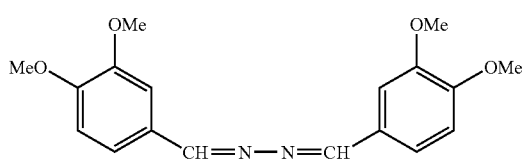

EXAMPLE 157

Hydrazine monohydrate (2.5) and 1-naphthaldehyde (15.6 g) were combined in 100 g of isopropanol and heated at 80° C. for 3 hours. The reaction mixture was cooled and the resulting solid was filtered, washed with isopropanol and dried to give 13.6 g of a solid (7) having a melting poing of from 156 to 160° C. A solution of the solid in acetonitrile had a strong UV absorption between 320 to 380 nm with a maximum absorption at 354 nm.

(7)

EXAMPLE 158

Hydrazine monohydrate (2.5 g) and 2-thiophene carboxaldehyde (11.2 g) were combined in 100 g of isopropanol and heated at 80° C. for 3 hours. The reaction mixture was cooled and the resulting solid was filtered, washed with isopropanol and dried to give 9.7 g of a solid (8) having a melting poing of from 162 to 164° C. A solution of the solid in acetonitrile had a strong UV absorption between 280 to 340 nm with a maximum absorption at 298 nm.

(8)

EXAMPLE 159

Hydrazine monohydrate (2.5 g) and pyridine-2-carboxaldehyde (10.7 g) were combined in 100 g of isopropanol and heated at 80° C. for 3 hours. The reaction mixture was cooled and the resulting solid was filtered, washed with isopropanol and dried to give 2.5 g of a solid (9) having a melting poing of from 162 to 164° C. A solution of the solid in acetonitrile had a strong UV absorption between 280 to 340 nm with a maximum absorption at 298 nm.

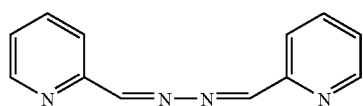

(9)

EXAMPLES 160-163

The method of Example 156 was repeated as illustrated in Equation 4 with (a) p-diethylaminobenzaldehyde, (b) p-methoxybenzaldehyde, (c) 4-hydroxy-3-methoxybenzaldehyde, and (d) thiophene-2-carboxaldehyde, respectively to provide hydrazones of formula III (where m=1 and L=H)

GCH=N—N=CHG    XVIII where G is:

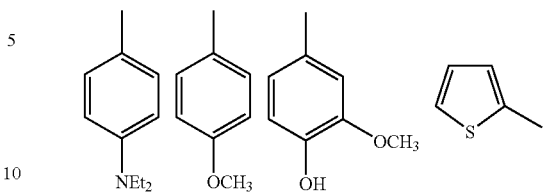

EXAMPLES 164-175

Using the general reaction conditions described in Example 156, compounds of formula III are prepared according to Equation 4 as illustrated in examples 164-175 where m=1, L=H and G is:

| EXAMPLE | $X^7$ | $X^8$ | $X^9$ |
|---|---|---|---|
| 164 | H | H | H |
| 165 | H | H | $C_{12}H_{25}$ |
| 166 | $C_2H_5$ | H | $OC_2H_5$ |
| 167 | H | H | $NHCOC_4H_9$ |
| 168 | $C_8H_{17}$ | H | $NH_2$ |
| 169 | H | COOH | H |
| 170 | $C_4H_9$ | $COOCH_3$ | $C_2H_5$ |
| 171 | H | $COOC_8H_{17}$ | $OC_2H_5$ |
| 172 | $C_{12}H_{25}$ | $COOC_{11}H_{23}$ | $NHCOC_8H_{17}$ |
| 173 | H | $COOC_3H_7$ | $NH_2$ |
| 174 | H | H | $C_4H_9$ |
| 175 | H | H | $OC_3H_7$ |

EXAMPLES 176-183

Using the general reaction conditions described in Example 156, compounds of formula III are prepared according to Equation 4 as illustrated in examples 171-178 where m=1, L=H and G is:

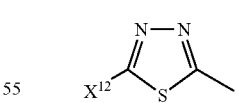

and $X^{12}$ is —H, —$NEt_2$, —$NH_2$, —$NHCOCH_3$, —$OC_4H_9$, phenyl, —$COOCH_3$, and —$C_3H_7$,

EXAMPLES 184-191

Using the general reaction conditions described in Example 156, compounds of formula III are prepared according to Equation 4 as illustrated in examples 184-191 where m=1, L=H and G is:

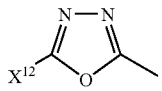

and $X^{12}$ is H, $NMe_2$, $NH_2$, $NHCOC_2H_5$, $OC_{12}H_{25}$, phenyl, $COOC_3H_7$, and $C_4H_9$.

EXAMPLES 192-202

Using the general reaction conditions described in Example 156, compounds of formula III are prepared according to Equation 4 as illustrated in examples 192-202 where m=1, L=H and G is:

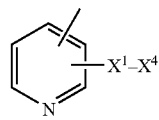

| EXAMPLE | Aldehyde | $X^1$ | $X^2$ | $X^3$ | $X^4$ |
|---|---|---|---|---|---|
| 192 | 2-pyridyl | 3-H | 4-Me | 5-H | 6-H |
| 193 | 2-pyridyl | 3-H | 4-H | 5-H | 6-Me |
| 194 | 2-pyridyl | 3-COOEt | 4-H | 5-H | 6-H |
| 195 | 2-pyridyl | 3-CN | 4-H | 5-H | 6-H |
| 196 | 2-pyridyl | 3-H | 4-phenyl | 5-H | 6-H |
| 197 | 2-pyridyl | 3-$CONH_2$ | 4-H | 5-H | 6-H |
| 198 | 2-pyridyl | 3-$SO_2Et$ | 4-H | 5-H | 6-H |
| 199 | 3-pyridyl | 2-Cl | 4-H | 5-H | 6-H |
| 200 | 3-pyridyl | 2-H | 4-$CH_3$ | 5-H | 6-H |
| 201 | 4-pyridyl | 2-H | 3-$SO_2NHC_{10}H_{21}$ | 5-H | 6-H |
| 202 | 4-pyridyl | 2-H | 3-$CONH_2$ | 5-H | 6-H |

EXAMPLE 203-211

Using the general reaction conditions described in Example 156, compounds of formula III are prepared according to Equation 4 as illustrated in examples 203-211 where m=1, L=H and G is:

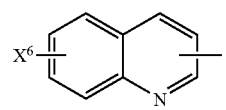

| EXAMPLE | Aldehyde | $X^6$ |
|---|---|---|
| 203 | 2-quinolyl | $OC_2H_5$ |
| 204 | 2-quinolyl | $CH_3$ |
| 205 | 2-quinolyl | $COOC_2H_5$ |
| 206 | 2-quinolyl | $SO_2C_{12}H_{25}$ |
| 207 | 2-quinolyl | Cl |
| 208 | 3-quinolyl | $OC_8H_{17}$ |
| 209 | 3-quinolyl | $C_3H_7$ |
| 210 | 4-quinolyl | $C_2H_5$ |
| 211 | 4-quinolyl | $COOC_4H_9$ |

An unsymmetrical hydrazone is made by first reacting one mole of an aldehyde GCHO with one mole of hydrazine and subsequently reacting the initial adduct with a second mole of an aldehyde G'CHO.

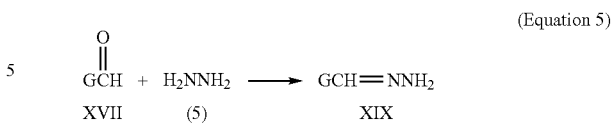

(Equation 5)

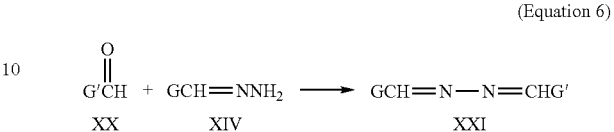

(Equation 6)

EXAMPLE 212

3,4-Dimethoxybenzaldehyde, 75 g (0.45 mole) is gradually added with stirring to excess hydrazine hydrate in 250 g of isopropanol over about an hour. The resulting reaction mixture is heated to reflux for about one hour. The excess hydrazine can be removed or the intermediate isolated and then further reacted with a second aldehyde as described above. A second aldehyde is added to the intermediate under similar reaction conditions. If the second aldehyde is thiophene-2-carboxaldehyde a hydrazone having the structure shown above (XXI) is obtained where G is phenyl and G' is 2-thienyl. A variety of unsymmetrical hydrazones can be made in this manner by utilizing two differently substituted aldehydes.

EXAMPLES 213-215

Mixed oxazolone/azine UV absorbers of formula IV and V can be prepared by several reaction sequences based on the chemistry taught herein. The following reaction sequences are two possible routes to compounds of formula IV and V

EXAMPLE 216

A.) Formula IV—(Equation 9)

a)

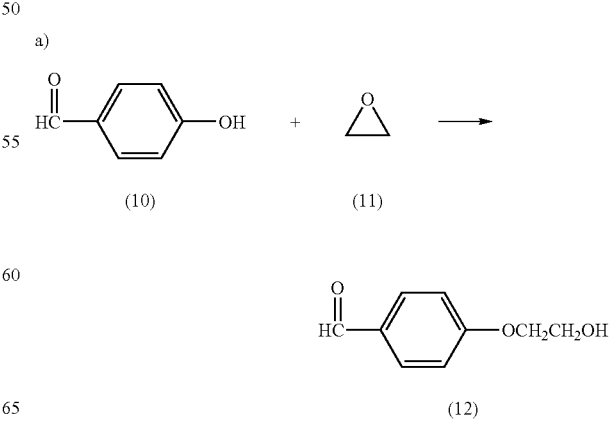

b)
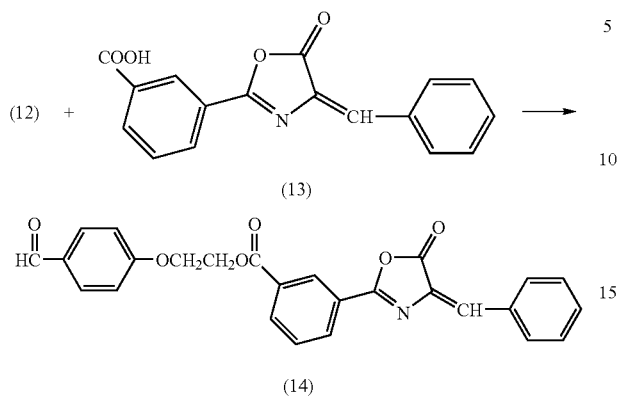
c)
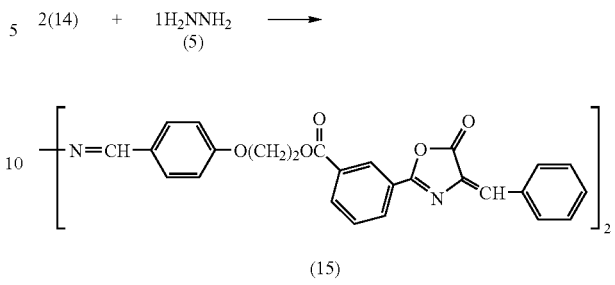
EXAMPLE 217
B. Formula V—(Equation 10)
a)
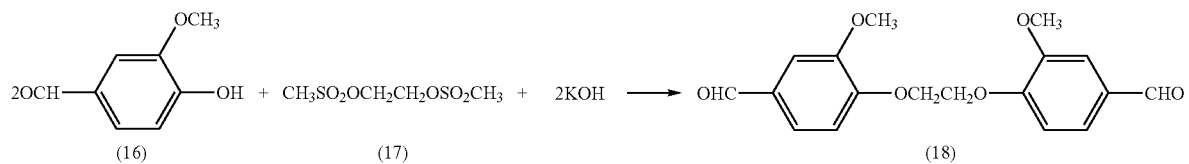
b)
2(18) + NH$_2$NH$_2$—H$_2$O ⟶
         (5)
(with slow addition hydrazine to (18)
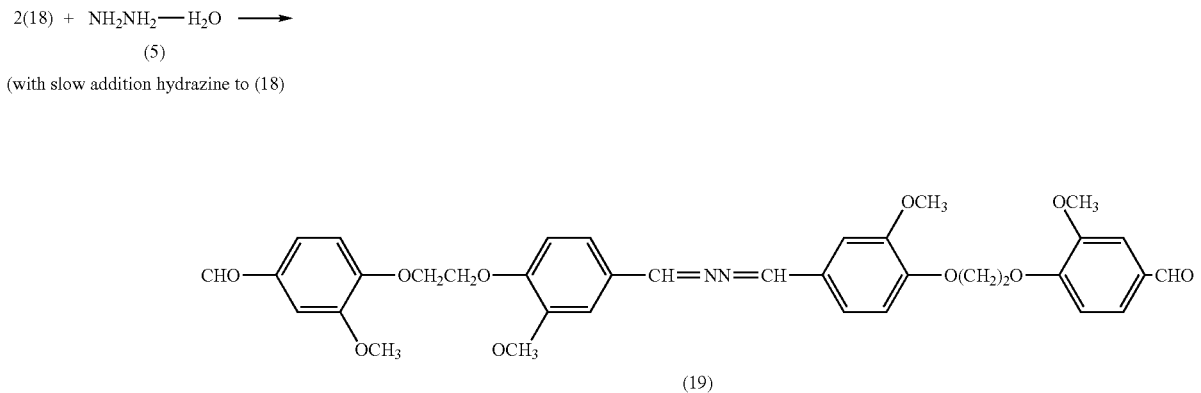
c)
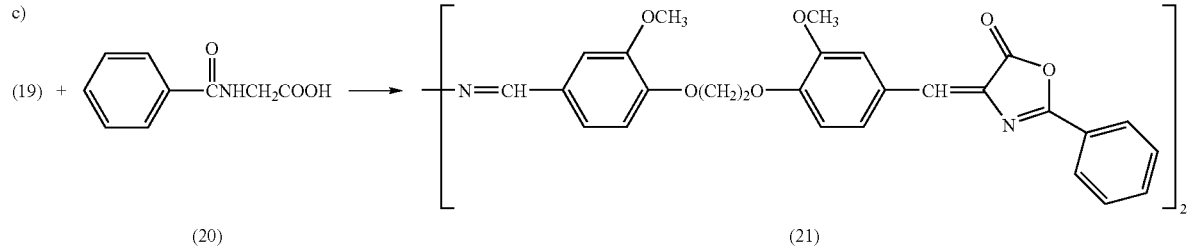

EXAMPLE 218

C. Formula XX—(Equation 11)

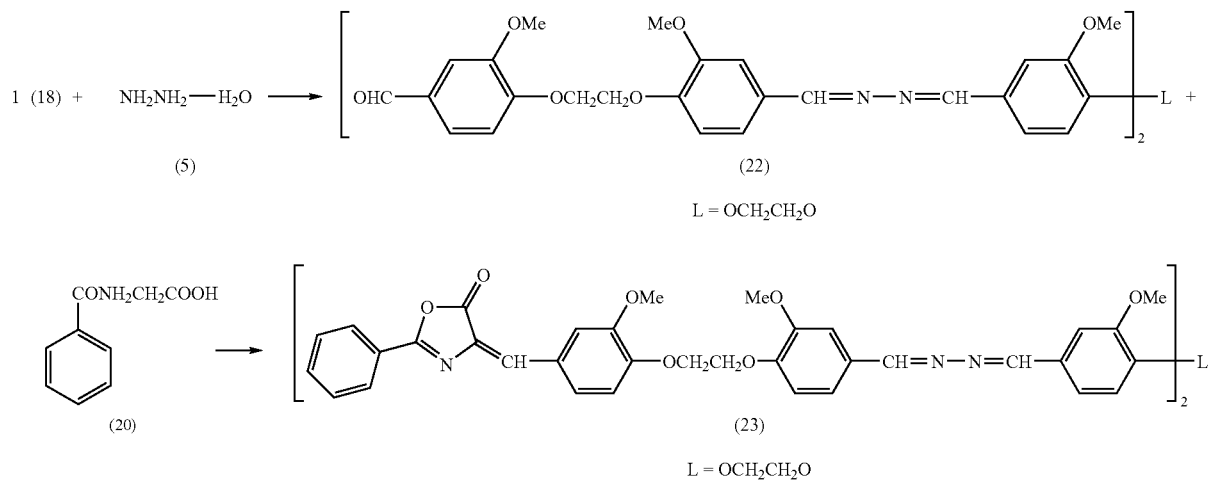

EXAMPLE 219

Hydrazine hydrate (2.5 g) and terephthaldehyde (13.4 g) were combined in 75 g of mixed xylenes and 75 g of N-methylpyrrolidone, the reaction mixture was heated to reflux with stirring and the water evolved collected in a Dean Stark collector. After 4.5 hours the theoretical amount of water had been collected and the reaction mixture was cooled to 50° C. 4-aminohippuric acid (19.4 g) was added, the reaction mixture heated to reflux for about 3 hours with further water collection and the resulting reaction mixture cooled to 40° C. Acetic anhydride (20.0 g), sodium acetate (8.2 g) and benzaldehyde (11.2 g) were added to the reaction mixture and the mixture was heated and maintained at 100° C. for 16 hours. The reaction mixture was cooled, the solid washed with additional isopropanol and hot water to remove salts and the resulting solid dried to give 18 g of a solid (24) that had not melted when heated to 340° C. A solution of the solid dissolved in N-methylpyrrolidone had a strong UV absorption from 300 to 400 nm.

EXAMPLE 220

4-Hydroxybenzaldehyde (12.2 g), 1,3-dibromopropane (10.01 g), and potassium hydroxide (10 g) were combined in 75 g of mixed xylenes and 40 g of N-methylpyrrolidone and the reaction mixture was heated to reflux for more than 3 hours. The reaction mixture was cooled to 70° C. and sufficient water was added to form an aqueous layer. The water layer containing inorganic salts was removed, hydrazine monohydrate (1.25 g) and 50 g of mixed xylenes were added and the reaction mixture was heated to reflux and the water collected in a Dean Stark trap until water evolution stopped. The resulting reaction mixture was cooled to 50° C. and acetic anhydride (10.2 g), sodium acetate (4.12 g), and hippuric acid (8.95 g) were added to the reaction mixture. The resulting mixture was heated and maintained at 100 to 110° C. for twenty hours. The reaction mixture was cooled, the resulting solid washed with a cold mixture of water and isopropanol and the solid dried to give 2.4 g of a solid (25) melting at 265° C. The solid, dissolved in N-methylpyrrolidone exhibited a strong UV absorption from 320 to 400 nm with a maximum absorption at about 320 nm.

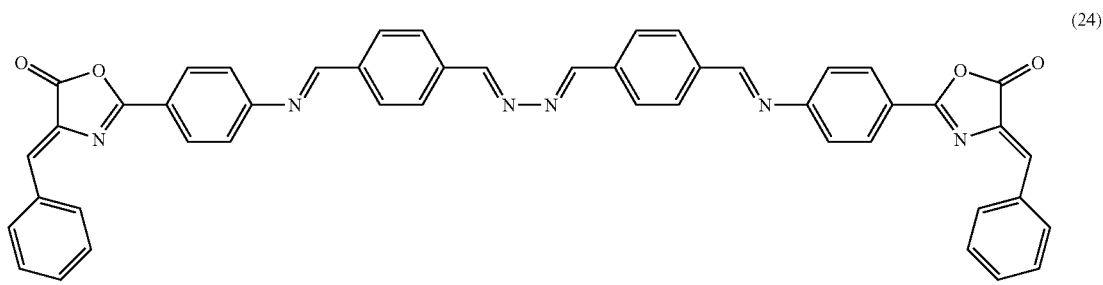

(24)

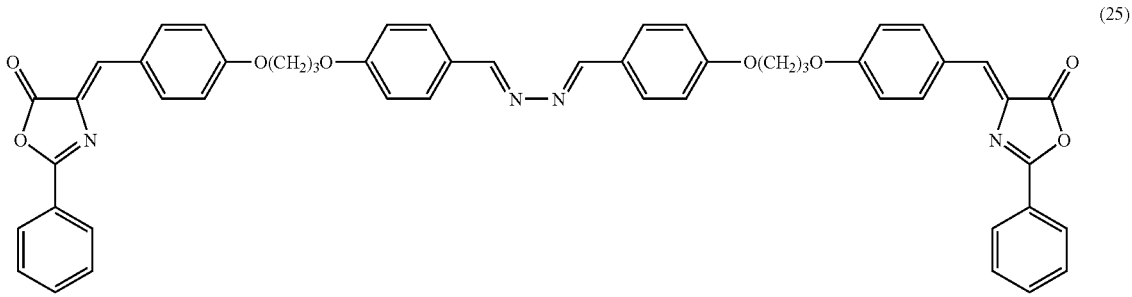

(25)

EXAMPLE 221

Hydrazine hydrate (30 g) was combined with 100 g of n-methylpyrrolidone in a 500 mL flask with a distillation head and the mixture heated to 40° C. Veratraldehyde (33.2 g) was added to the warm mixture over 20 minutes with stirring and when addition was completed the resulting mixture was heated at 60° C. for 30 minutes with continued stirring. The reaction mixture was heated further to distill off excess hydrazine and water until the reaction mixture reached a temperature of 200° C. The mixture was cooled to 50° C. and 13.4 g of terephthaldehyde was added and the mixture heated to a temperature of 150° C. The resulting reaction mixture was maintained with stirring at 150° C. for 3 hours and then cooled to room temperature. The solid (26) that formed was filtered, washed with isopropyl alcohol and dried to a constant weight to give 38.8 g of a yellow product.

pellets for future molding. Alternatively, one or more UV absorbers can be formulated in a liquid carrier along with other additives and mixed uniformly with the melted thermoplastic in the molding stage. For polyesters the liquid carrier can be a phthalate ester or glycol material. Thermoplastic films can be formed by evaporating the solvent from a solution of the thermoplastic/UV absorber combination.

The UV absorbers from Examples 1 through 211 can be introduced within an injection molding operation for a polyester thermoplastic such as PET and a variety of other thermoplastic materials. A solution containing the absorbers in diethyl terephthalate or other solvent is added by way of a positive displacement or transfer pump, either continuously or, preferably, intermittently into an injection-molding machine. At the same time, pellets of the PET resin are fed into the throat of the molding machine by way of a screw that works in concert with the transfer pump metering the

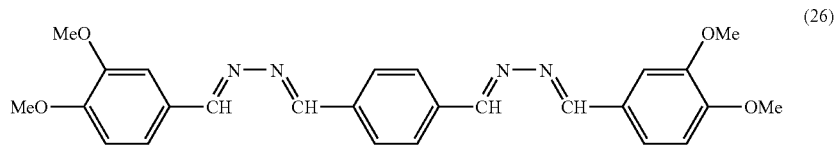

(26)

The UV absorbers prepared in experiments 156-221 absorb UV radiation between 300 and 400 nm, neither migrate nor are extracted by liquids in contact with the thermoplastic article, are generally lightly colored or colorless and do not adversely affect the articles physical properties or appearance and because the UV absorbers are effective at very low concentrations, they do not interfere with recycling the thermoplastic.

The methods provided can be used to prepare a wide variety of compounds of formulas (I), (II), (III), (IV), (V) and (VI) where D, E and G are independently substituted or unsubstituted phenyl, naphthyl, thienyl, thiazoyl, thiadiazolyl, oxadiazolyl, pyridyl, or quinolyl.

Thermoplastic articles were formed according to the following methods. A premix containing one or more UV absorbers and other plastic additives such as colorants, oxygen scavengers, antioxidants, lubricants, etc. can be mixed with a thermoplastic at a temperature sufficiently high to melt the thermoplastic in a compounding or masterbatch step. The resulting material can be extruded to form an article or into absorber solution. The rotating screw pulls the pellets into the feed throat while the pump activated introduction of the absorber solution into the same area of the machine provides a consistent ratio of pellets to absorber. The mix of absorber solution and PET pellets is gravity fed into a mixing chamber within the molding machine. In the feed section, melting and mixing are accomplished through the utilization of a rotated and heated screw extruder. The resulting heated thermoplastic composition is injected into a mold to form a thermoplastic article. The method described above can also be used to form articles in the form of sheets, ribbons and plaques. Plaques of general purpose polystyrene (GPPS) containing products from Example 1, Example 154, as well as two commercial UV absorbers (TINUVIN® 234 and TINUVIN® 326) were prepared having a thickness of 0.098 inches. The TINUVIN® products are benzotriazoles available from Ciba Specialty Chemicals headquartered in Basil, Switzerland. TINUVIN is a registered trademark of Ciba Specialty Chemicals. The UV absorbance of the plaque between 300 and 440 nm was determined at 5 nm increments to provide the results below.

| Wavelength (nm) | Natural GPPS Absorbance | 0.01% TINUVIN ® 234/GPPS Absorbance | 0.01% TINUVIN ® 326/GPPS Absorbance | 0.006% Product from Example 1 Absorbance | 0.006% Product from Example 154 Absorbance |
|---|---|---|---|---|---|
| 440 | 0.0073 | 0.0040 | 0.0042 | 0.0115 | 0.0068 |
| 435 | 0.0081 | 0.0048 | 0.0050 | 0.0123 | 0.0077 |
| 430 | 0.0090 | 0.0056 | 0.0061 | 0.0135 | 0.0088 |
| 425 | 0.0103 | 0.0067 | 0.0079 | 0.0154 | 0.0101 |
| 420 | 0.0115 | 0.0078 | 0.0111 | 0.0186 | 0.0121 |
| 415 | 0.0129 | 0.0096 | 0.0183 | 0.0253 | 0.0153 |
| 410 | 0.0148 | 0.0122 | 0.0341 | 0.0426 | 0.0208 |
| 405 | 0.0170 | 0.0170 | 0.0693 | 0.0967 | 0.0299 |
| 400 | 0.0197 | 0.0275 | 0.1379 | 0.2716 | 0.0427 |
| 395 | 0.0231 | 0.0514 | 0.2506 | 0.7218 | 0.0670 |
| 390 | 0.0276 | 0.1017 | 0.4009 | 1.1388 | 0.1193 |
| 385 | 0.0352 | 0.1964 | 0.5680 | 1.1085 | 0.2369 |
| 380 | 0.0547 | 0.3396 | 0.7372 | 1.0717 | 0.4783 |
| 375 | 0.1283 | 0.5430 | 0.9438 | 1.3063 | 0.8286 |
| 370 | 0.2914 | 0.8231 | 1.2198 | 1.7230 | 1.1588 |
| 365 | 0.3868 | 1.0365 | 1.4291 | 1.7802 | 1.3937 |
| 360 | 0.4310 | 1.1973 | 1.5599 | 1.6469 | 1.7068 |
| 355 | 0.4438 | 1.2853 | 1.5861 | 1.6007 | 2.0013 |
| 350 | 0.4509 | 1.3192 | 1.5632 | 1.6115 | 2.0626 |
| 345 | 0.4620 | 1.3179 | 1.5103 | 1.4457 | 2.0164 |
| 340 | 0.4818 | 1.2969 | 1.4456 | 1.2632 | 2.0079 |
| 335 | 0.5175 | 1.2686 | 1.4117 | 1.1995 | 1.9164 |
| 330 | 0.5674 | 1.2495 | 1.4720 | 1.1599 | 1.7708 |
| 325 | 0.6093 | 1.2557 | 1.5867 | 1.0807 | 1.6445 |
| 320 | 0.6631 | 1.3444 | 1.6890 | 1.0573 | 1.5347 |
| 315 | 0.7323 | 1.4828 | 1.7889 | 1.0813 | 1.4594 |
| 310 | 0.7937 | 1.5986 | 1.8322 | 1.1005 | 1.4268 |
| 305 | 0.8887 | 1.7139 | 1.8420 | 1.1809 | 1.4519 |
| 300 | 1.1115 | 1.9069 | 1.9498 | 1.4318 | 1.6360 |

Tests carried out with the similar levels of the other products and combinations of products selected from the examples described herein demonstrate reduced UV transmission through the plaques at wavelengths between about 300 and about 400 nm, providing evidence that UV radiation is being absorbed by the products contained therein.

Thermal stability of the UV absorber can be assessed by extruding plaques containing one or more UV absorbers at processing temperatures ranging from about 425 to 550° F. The UV absorption for each plaques extruded over this temperature range can be measured from about 300 nm to about 400 nm. A demonstration that the UV absorbance of plaques extruded at the highest temperatures is comparable to the UV absorbance for plaques extruded at lower temperatures demonstrates temperature stability in that the higher temperatures does not adversely affect the UV absorber's stability and performance. The UV absorbers tested in this manner have thus far shown good temperature stability.

The lower UV transmittance that resulted demonstrated the ability of UV absorbers having oxazolone and/or azine functionality to filter UV radiation. As a result, the thermoplastic article itself and any material it shields are protected from the harmful effects of UV radiation.

While applicant's invention has been described in detail above with reference to specific embodiments, it will be understood that modifications and alterations in the embodiments disclosed may be made by those practiced in the art without departing from the spirit and scope of the invention. All such modifications and alterations are intended to be covered. In addition, all publications cited herein are indicative of the level of skill in the art and are hereby incorporated by reference in their entirety as if each had been individually incorporated by reference and fully set forth.

What is claimed:

1. A thermoplastic article, the article having a form and thickness and comprising:
   (a) a clear or translucent thermoplastic, and
   (b) an amount of at least one UV absorbing compound that is thermally stable to thermoplastic processing temperatures, of formulas (I), (II), (III), (IV), (V) or (VI) sufficient to reduce the transmission of ultraviolet radiation into the article,

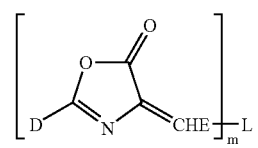

I

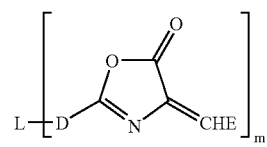

II

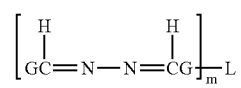

III

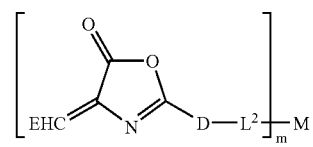

IV

-continued

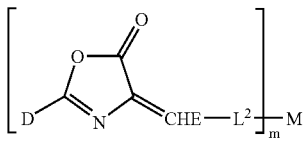
V

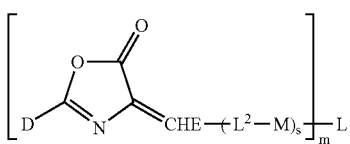
VI wherein
M is

-GCH=N—N=CHG- $L^1$ is
H, $C_1$-$C_{12}$ alkyl, $(CH_2)_nOH$, COOR, $SO_2R$, $OR^1$, Cl, phenyl, $C(W)R^7$, NHCOR, $NR_2$, phenyl, or imino, provided R is H or $C_1$-$C_{12}$ alkyl, $R^1$ is H or $C_1$-$C_{12}$ alkyl, n is an integer ranging from about 2 to about 8, $R^7$ is $C_1$-$C_{12}$ alkyl, phenyl or phenalkyl and W is O or S;

$L^2$ is
(a) A, A-V—B, [V—B]$_i$, or V where
(i) A and B are independently

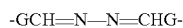

(ii) i is an integer ranging from about 1 to about 6; and
(iii) V is independently $(CHR^{10})_o$—$U_r$—$(CH_2)_p$ where U is an aliphatic ring containing from 4 to 10 carbons or an aryl group, $R^{10}$ is H or $CH_3$, r is 0 or 1, o is 0 or an integer ranging from about 1 to about 9 and p is 0 or an integer ranging from about 1 to about 9; or
(b)

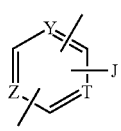

where Z, T and Y are independently carbon or nitrogen and J is OR, Cl, OAc, $NH_2$ or NHR where R is $C_1$-$C_{12}$ alkyl;
D, E and G are independently phenyl, substituted phenyl, naphthyl, substituted naphthyl, thienyl, substituted thienyl, thiazoyl, substituted thiazoyl, thiadiazolyl, substituted thiadiazolyl, oxadiazolyl, substituted oxadiazolyl, pyridyl, substituted pyridyl, quinolyl or substituted quinolyl;
m is 1 or 2;
when m is 1, L is $L^1$ or when m is 2, L is $L^2$; and
s is 0 or an integer ranging from about 1 to about 8.

2. The article of claim 1, wherein the thermoplastic is selected from the group consisting of polystyrenes, polyesters, polyamides, polyesteramides, polymethacrylates, polyolefins, polycarbonates, acrylonitrile-butadiene styrenes, and acrylics.

3. The article of claim 2, wherein the composition contains at least two UV absorbing compounds.

4. The article of claim 3, wherein the composition exhibits ultraviolet absorption characteristics over the range of wavelengths from about 300 nm to about 400 nm and retains said ultraviolet absorption characteristics after extrusion or molding at temperatures up to about 550° F.

5. The article of claim 1 wherein the UV absorbing compound is represented by formulas (I), (II), (III), (IV), (V) or (VI) wherein each D and G is independently

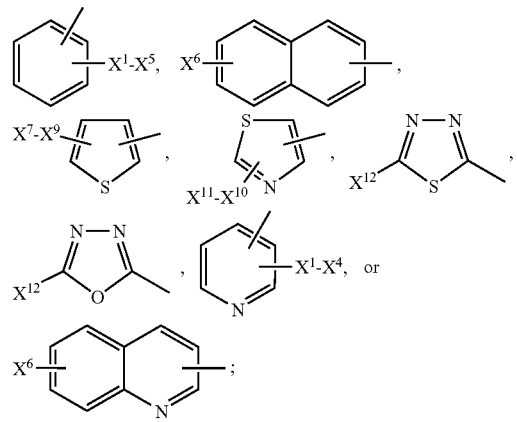

wherein
$X^1$-$X^6$ are independently H, $C_1$-$C_{12}$ alkyl, $(CH_2)_nOH$, COOR, $SO_2R$, $OR^1$, Cl, phenyl, —$C(W)R^7$ or -L-G-CH=C($COOR^1$)(CN) provided R is $C_1$-$C_{12}$ alkyl, $R^1$ is H or $C_1$-$C_{12}$ alkyl, n is an integer ranging from about 2 to about 8, $R^7$ is $C_1$-$C_{12}$ alkyl, phenyl or phenalkyl and W is O or S;
$X^7$-$X^9$ are independently H, $C_1$-$C_{12}$ alkyl, COOR, $OR^1$, NHCOR, -L-G-CH=C($COOR^1$)(CN) or $NH_2$ provided R is $C_1$-$C_{12}$ alkyl, and $R^1$ is H or $C_1$-$C_{12}$ alkyl;
$X^{10}$-$X^{11}$ are independently H, $C_1$-$C_{12}$ alkyl, phenyl, or -L-G-CH=C($COOR^1$)(CN) or $NHCOR^1$ provided $R^1$ is $C_1$-$C_{12}$ alkyl; and
$X^{12}$ is H, $C_1$-$C_{12}$ alkyl, COOR, phenyl, OR, NHCOR, -L-G-CH=C(COOR)CN, OR, $NH_2$, NHR, NRR provided R is $C_1$-$C_{12}$ alkyl.

6. The article of claim 5 wherein each E is independently

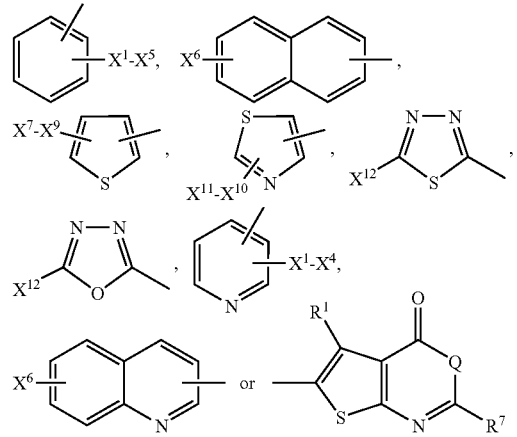

wherein

X$^1$-X$^6$ are independently H, C$_1$-C$_{12}$ alkyl, (CH$_2$)$_n$OH, COOR, SO$_2$R, OR$^1$, Cl, phenyl, —C(W)R$^7$ or -L-G-CH=C(COOR$^1$)(CN) provided R is C$_1$-C$_{12}$ alkyl, R$^1$ is H or C$_1$-C$_{12}$ alkyl, n is an integer ranging from about 2 to about 8, R$^7$ is C$_1$-C$_{12}$ alkyl, phenyl or phenalkyl and W is O or S;

X$^7$-X$^9$ are independently H, C$_1$-C$_{12}$ alkyl, COOR, OR$^1$, NHCOR, -L-G-CH=C(COOR$^1$)(CN) or NH$_2$ provided R is C$_1$-C$_{12}$ alkyl, and R$^1$ is H or C$_1$-C$_{12}$ alkyl;

X$^{10}$-X$^{11}$ are independently H, C$_1$-C$_{12}$ alkyl, phenyl, or -L-G-CH=C(COOR$^1$)(CN) or NHCOR$^1$ provided R$^1$ is C$_1$-C$_{12}$ alkyl;

X$^{12}$ is H, C$_1$-C$_{12}$ alkyl, COOR, phenyl, OR, NHCOR, -L-G-CH=C(COOR)CN, OR, NH$_2$, NHR, NRR provided R is C$_1$-C$_{12}$ alkyl; and Q is O or NR$^1$.

7. The article of claim 6, wherein the thermoplastic is selected from the group consisting of polystyrenes, polyesters, polyamides, polyesteramides, polymethacrylates, polyolefins, polycarbonates, acrylonitrile-butadiene styrenes, and acrylics.

8. The article of claim 7, wherein the UV absorbing compound is

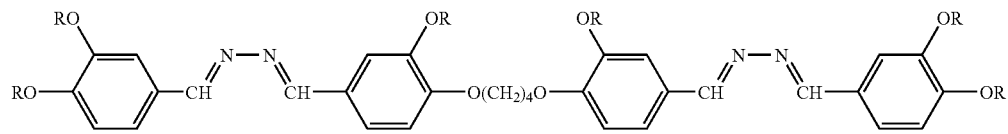

and R is H or C$_1$-C$_{12}$ alkyl.

9. The article of claim 8, wherein R is CH$_3$.

10. The article of claim 7, wherein the UV absorbing compound is

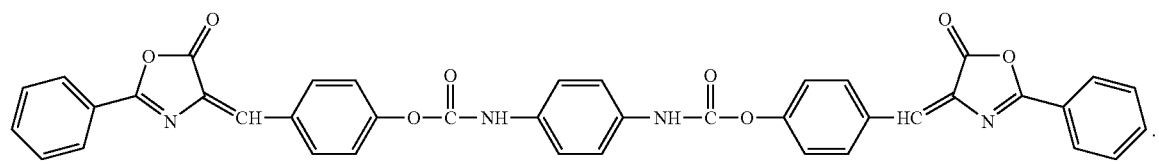

11. The article of claim 7, wherein the UV absorbing compound is

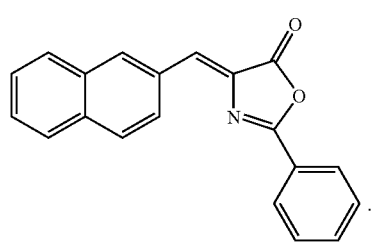

12. The article of claim 7, wherein the UV absorbing compound is

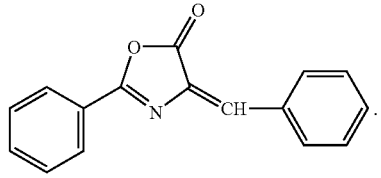

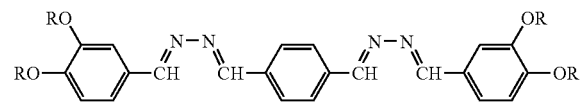

and R is H or C$_1$-C$_{12}$ alkyl.

13. The article of claim 12, wherein R is CH$_3$.

14. The article of claim 7, wherein the UV absorbing compound is

15. The article of claim 7, wherein the UV absorbing compound is

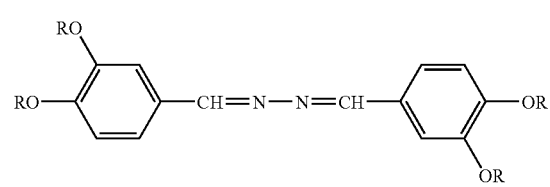

and R is H or C$_1$-C$_{12}$ alkyl.

16. The article of claim 15, wherein R is CH$_3$.

17. The article of claim 7, wherein the thermoplastic is a polyester.

18. The article of claim 17, wherein the polyester is polyethylene terephthalate.

19. The article of claim 17, wherein the amount of UV absorbing compounds is about 0.001% to about 5% by weight.

20. A compound of formula (I) or (II)

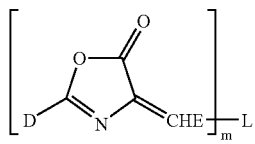
(I)

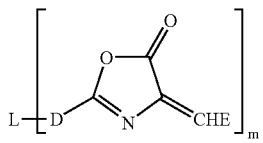
(II)

wherein D and E are independently

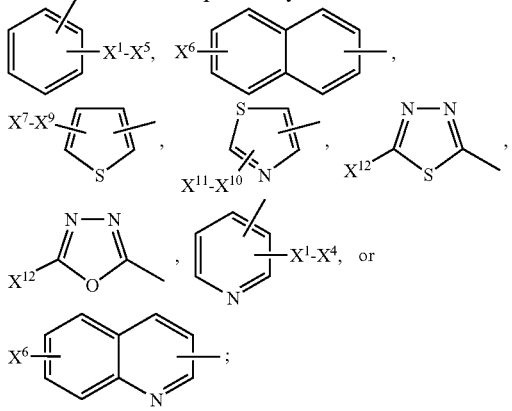

$X^1$-$X^6$ are independently H, $C_1$-$C_{12}$ alkyl, $(CH_2)_n$OH, COOR, $SO_2$R, $OR^1$, Cl, phenyl, —C(W)$R^7$ or -L-G-CH=C(COOR$^1$)(CN) provided R is $C_1$-$C_{12}$ alkyl, $R^1$ is H or $C_1$-$C_{12}$ alkyl, n is an integer ranging from about 2 to about 8, $R^7$ is $C_1$-$C_{12}$ alkyl, phenyl or phenalkyl and W is O or S;

$X^7$-$X^9$ are independently H, $C_1$-$C_{12}$ alkyl, COOR, $OR^1$, NHCOR, -L-G-CH=C(COOR$^1$)(CN) or $NH_2$ provided R is $C_1$-$C_{12}$ alkyl, and $R^1$ is H or $C_1$-$C_{12}$ alkyl;

$X^{10}$-$X^{11}$ are independently H, $C_1$-$C_{12}$ alkyl, phenyl, or -L-G-CH=C(COOR$^1$)(CN) or NHCOR$^1$ provided $R^1$ is $C_1$-$C_{12}$ alkyl;

$X^{12}$ is H, $C_1$-$C_{12}$ alkyl, COOR, phenyl, OR, NHCOR, -L-G-CH=C(COOR)CN, OR, $NH_2$, NHR, NRR provided R is $C_1$-$C_{12}$ alkyl L is
(a) A-V—B, [V—B]$_i$, or V where
(i) A and B are independently

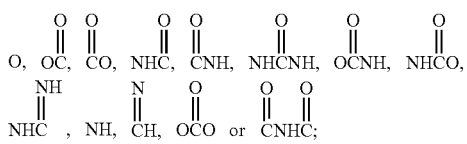

(ii) i is an integer ranging from about 1 to about 6; and
(iii) V is independently (CHR$^{10}$)$_o$—U$_r$—(CH$_2$)$_p$ where U is an aliphatic ring containing from 4 to 10 carbons or an aryl group, $R^{10}$ is H or $CH_3$, r is 0 or 1, o is an integer ranging from about 1 to about 9 and p is 0 or an integer ranging from about 1 to about 9; or
(b)

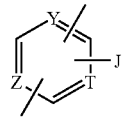

where Z, T and Y are independently carbon or nitrogen and J is OR, Cl, OAc, $NH_2$ or NHR where R is $C_1$-$C_{12}$ alkyl; and
m is 2.

21. A compound of formula (III)

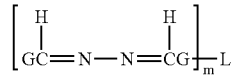
(III)

wherein G is

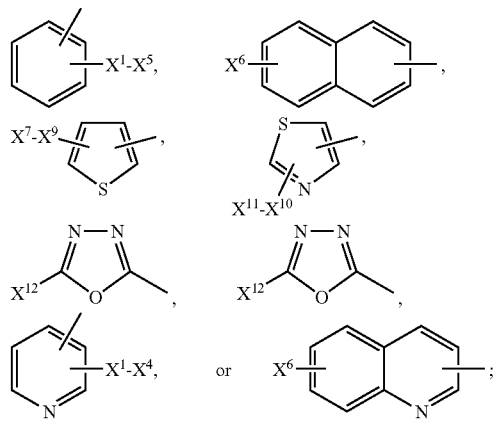

$X^1$-$X^6$ are independently H, $C_1$-$C_{12}$ alkyl, $(CH_2)_n$OH, COOR, $SO_2$R, $OR^1$, Cl, phenyl, —C(W)$R^7$ or -L-G-CH=C(COOR$^1$)(CN) provided R is $C_1$-$C_{12}$ alkyl, $R^1$ is H or $C_1$-$C_{12}$ alkyl, n is an integer ranging from about 2 to about 8, $R^7$ is $C_1$-$C_{12}$ alkyl, phenyl or phenalkyl and W is O or S;

$X^7$-$X^9$ are independently H, $C_1$-$C_{12}$ alkyl, COOR, $OR^1$, NHCOR, -L-G-CH=C(COOR$^1$)(CN) or NH$^2$ provided R is $C_1$-$C_{12}$ alkyl, and $R^1$ is H or $C_1$-$C_{12}$ alkyl;

$X^{10}$-X are independently H, $C_1$-$C_{12}$ alkyl, phenyl, or -L-G-CH=C(COOR$^1$)(CN) or NHCOR$^1$ provided $R^1$ $C_1$-$C_{12}$ alkyl;

$X^{12}$ is H, $C_1$-$C_{12}$ alkyl, COOR, phenyl, OR, NHCOR, L-G-CH=C(COOR)CN, OR, $NH_2$, NHR, NRR provided R is $C_1$-$C_{12}$ alkyl;

L is
(a) A, A-V—B, [V—B]$_I$ or V where
(i) A and B are independently

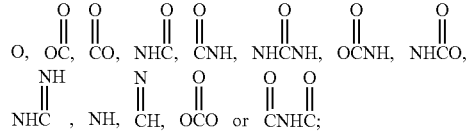

(ii) i is an integer ranging from about 1 to about 6; and
(iii) V is independently

where U is an aliphatic ring containing from 4 to 10 carbons or an aryl group, $R^{10}$ is H or $CH_3$, r is 0 or 1, o is an integer ranging from about 1 to about 9 and p is 0 or an integer ranging from about 1 to about 9; or (b)

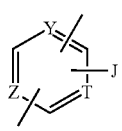

where Z, T and Y are independently carbon or nitrogen and J is OR, Cl, OAc, $NH_2$ or NHR where R is $C_1$-$C_{12}$ alkyl; and m is 2.

22. A compound of formula (IV), (V) or (VI)

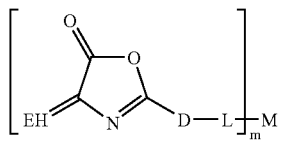 IV

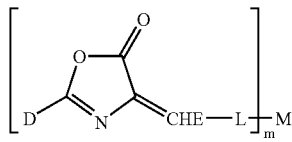 V

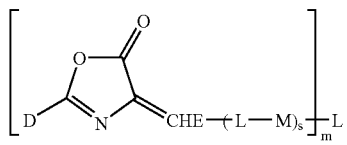 VI wherein M is

wherein D, E and G are independently

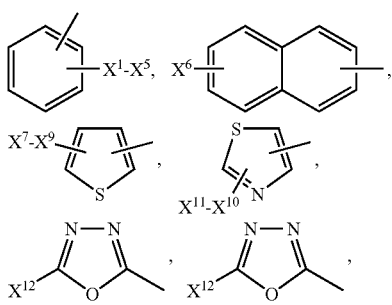

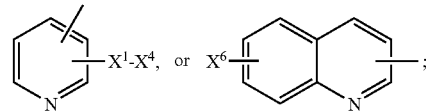

$X^1$-$X^6$ are independently H, $C_1$-$C_{12}$ alkyl, $(CH_2)_n$OH, COOR, $SO_2$R, $OR^1$, Cl, phenyl, —C(W)$R^7$ or -L-G-CH=C($COOR^1$)(CN) provided R is $C_1$-$C_{12}$ alkyl, $R^1$ is H or $C_1$-$C_{12}$ alkyl, n is an integer ranging from about 2 to about 8, $R^7$ is $C_1$-$C_{12}$ alkyl, phenyl or phenalkyl and W is O or S;

$X^7$-$X^9$ are independently H, $C_1$-$C_{12}$ alkyl, COOR, $OR^1$, NHCOR, -L-G-CH=C($COOR^1$)(CN) or $NH_2$ provided R is $C_1$-$C_{12}$ alkyl, $R^1$ is H or $C_1$-$C_{12}$ alkyl;

$X^{10}$-$X^{11}$ are independently H, $C_1$-$C_{12}$ alkyl, phenyl, or -L-G-CH=C($COOR^1$)(CN) or $NHCOR^1$ provided $R^1$ is $C_1$-$C_{12}$ alkyl;

$X^{12}$ is H, $C_1$-$C_{12}$ alkyl, COOR, phenyl, OR, NHCOR, -L-G-CH=C(COOR)CN, OR, $NH_2$, NHR, NRR provided R is $C_1$-$C_{12}$ alkyl;

L is (a) A, A-V—B, [V—B]$_i$, or V where
  (i) A and B are independently

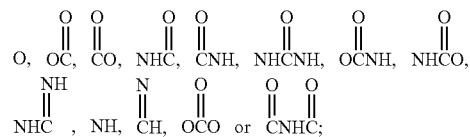

(ii) i is an integer ranging from about 1 to about 6; and
(iii) V is independently

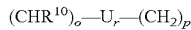

where U is an aliphatic ring containing from 4 to 10 carbons or an aryl group, $R^{10}$ is H or $CH_3$, r is 0 or 1, o is an integer ranging from about 1 to about 9 and p is 0 or an integer ranging from about 1 to about 9; or (b)

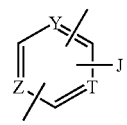

where Z, T and Y are independently carbon or nitrogen and J is OR, Cl, OAc, $NH_2$ or NHR where R is $C_1$-$C_{12}$ alkyl; s is 0 or an integer ranging from about 1 to about 8; and m=2.

23. A method for protecting a UV sensitive material from UV radiation comprising:
(a) selecting the UV sensitive material to protect;
(b) selecting a thermoplastic article of claim 1; and
(c) containing the UV sensitive material within the thermoplastic article.

24. The method of claim 23, wherein the thermoplastic is a polyester.

25. The method of claim 24, wherein the polyester is polyethylene terephthalate.

26. The method of claim 24, wherein at least one of the UV absorbers is selected from the group consisting of:

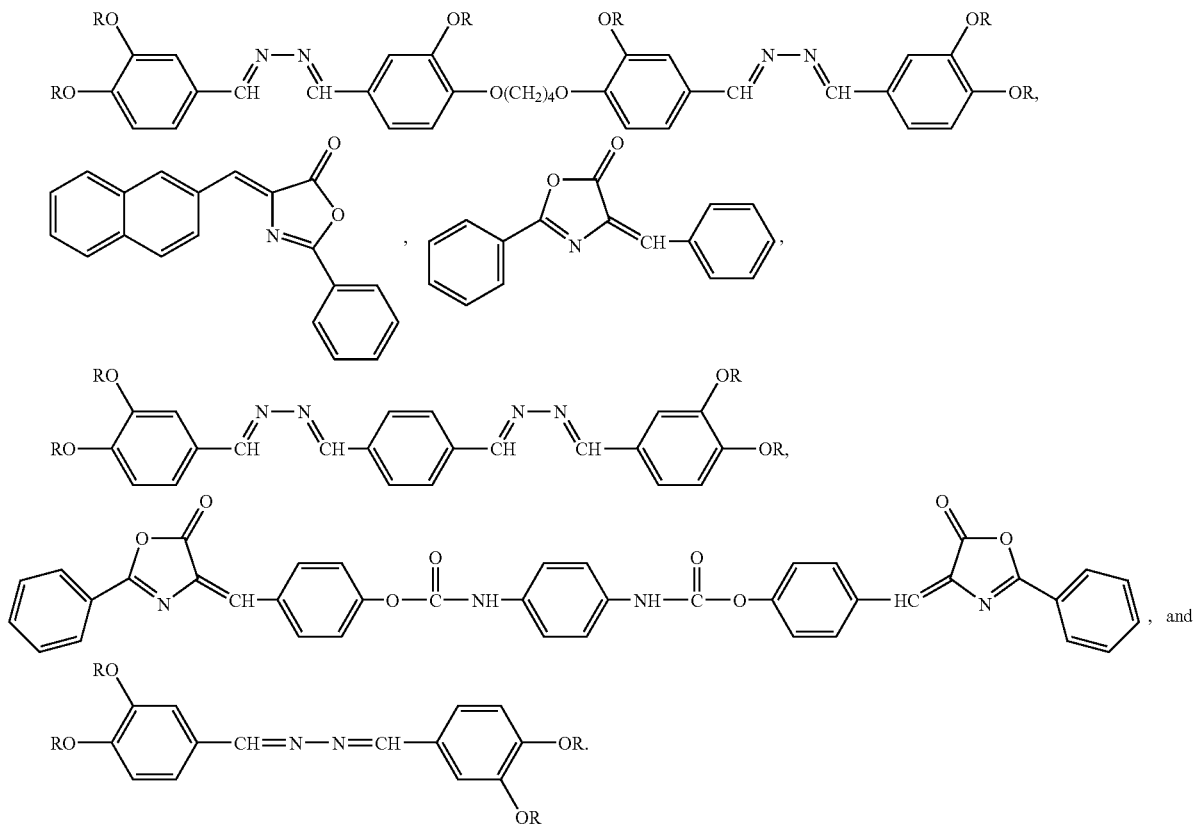

and R is H or $C_1$-$C_{12}$ alkyl.

27. The method of claim 26, wherein R is Me.
28. The method of claim 26, wherein R is Et.
29. A process for producing a thermoplastic article resistant to the transmission of ultraviolet radiation comprising:
(a) selecting one or more UV absorbing compounds of formulas (I), (II), (III), (IV), (V), (VI) or (VII);

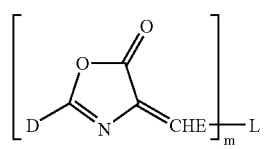

I

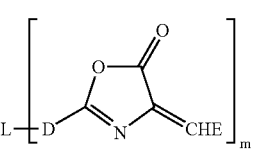

II

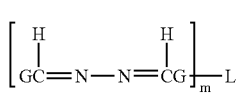

III

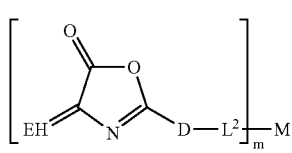

IV

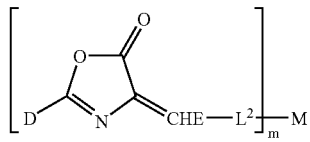

V

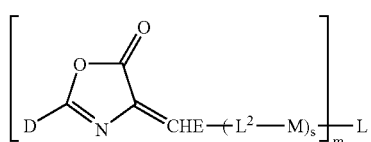

VI wherein

M is

-GCH=N—N=CHG- $L^1$ is

H, $C_1$-$C_{12}$ alkyl, $(CH_2)_n$OH, COOR, $SO_2R$, $OR^1$, Cl, phenyl, $C(W)R^7$, NHCOR, $NR_2$, phenyl, or imino, provided R is $C_1$-$C_{12}$ alkyl, $R^1$ is H or $C_1$-$C_{12}$ alkyl, n is an integer ranging from about 2 to about 8, $R^7$ is $C_1$-$C_{12}$ alkyl, phenyl or phenalkyl and W is O or S;

L² is
(a) A, A-V—B, [V—B]ᵢ, or V where
(i) A and B are independently

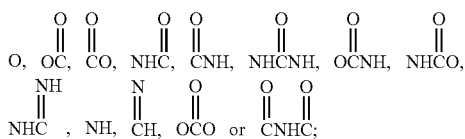

(ii) i is an integer ranging from about 1 to about 6; and
(iii) V is independently $(CHR^{10})_o—U_r—(CH_2)_p$ where U is an aliphatic ring containing from 4 to 10 carbons or an aryl group, $R^{10}$ is H or $CH_3$, r is 0 or 1, o is an integer ranging from about 1 to about 9 and p is 0 or an integer ranging from about 1 to about 9; or (b)

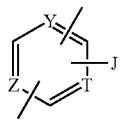

where Z, T and Y are independently carbon or nitrogen and J is OR, Cl, OAc, $NH_2$ or NHR where R is $C_1$-$C_{12}$ alkyl;
D, E and G are independently phenyl, substituted phenyl, naphthyl, substituted naphthyl, thienyl, substituted thienyl, thiazoyl, substituted thiazoyl, thiadiazolyl, substituted thiadiazolyl, oxadiazolyl, substituted oxadiazolyl, pyridyl, substituted pyridyl, quinolyl or substituted quinolyl, and
m is 1 or 2,
when m is 1, L is $L^1$ or when m is 2, L is $L^2$; and
s is 0 or an integer ranging from about 1 to about 8;
(b) combining the one or more UV absorbing compounds with a thermoplastic to form a mixture;
(c) heating the mixture to thermoplastic processing temperatures;
(d) treating the mixture to cause it to flow; and
(e) forming the thermoplastic article.

30. The process of claim 29, wherein treating includes melting the mixture.

31. The process of claim 29, wherein treating includes dissolving or dispersing the mixture in a solvent.

32. The process of claim 30, wherein the melting occurs at a temperature of at least 200° C. and forming is an injection molding process.

33. The process of claim 32, wherein the thermoplastic is selected from the group consisting of polystyrenes, polyesters, polyamides, polyesteramides, polymethacrylates, polyolefins, polycarbonates, acrylonitrile-butadiene styrenes, and acrylics.

34. The process of claim 33, wherein the thermoplastic is a polyester.

35. The process of claim 34, wherein the polyester is polyethylene terephthalate.

36. A thermoplastic composition comprising:
(a) a thermoplastic, and
(b) at least one UV absorbing compound that is thermally stable to thermoplastic processing temperatures, of formulas (I), (II), (III), (IV), (V) or (VI),

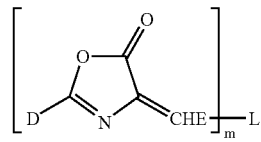 I

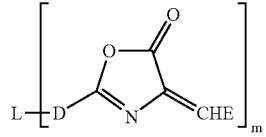 II

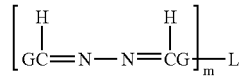 III

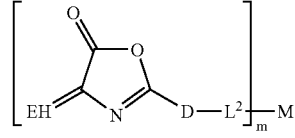 IV

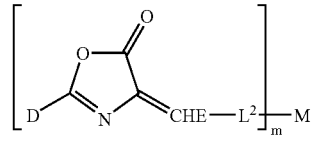 V

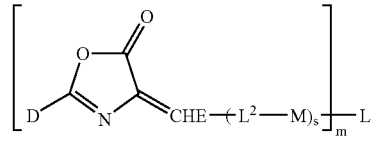 VI wherein
M is
-GCH=N—N=CHG- $L^1$ is
H, $C_1$-$C_{12}$ alkyl, $(CH_2)_nOH$, COOR, $SO_2R$, $OR^1$, Cl, phenyl, $C(W)R^7$, NHCOR, $NR_2$, phenyl, or imino, provided R is H or $C_1$-$C_{12}$ alkyl, $R^1$ is H or $C_1$-$C_{12}$ alkyl, n is an integer ranging from about 2 to about 8, $R^7$ is $C_1$-$C_{12}$ alkyl, phenyl or phenalkyl and W is O or S;

$L^2$ is
(a) A, A-V—B, [V—B]ᵢ, or V where
(i) A and B are independently

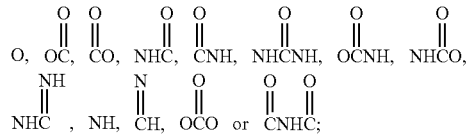

(ii) i is an integer ranging from about 1 to about 6; and
(iii) V is independently $(CHR^{10})_o—U_r—(CH_2)_p$ where U is an aliphatic ring containing from 4 to 10 carbons or an aryl group, $R^{10}$ is H or $CH_3$, r is 0 or 1, o is an integer ranging from about 1 to about 9 and p is 0 or an integer ranging from about 1 to about 9; or (b)

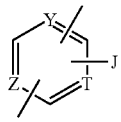

where Z, T and Y are independently carbon or nitrogen and J is OR, Cl, OAc, $NH_2$ or NHR where R is $C_1$-$C_{12}$ alkyl;

D, E and G are independently phenyl, substituted phenyl, naphthyl, substituted naphthyl, thienyl, substituted thienyl, thiazoyl, substituted thiazoyl, thiadiazolyl, substituted thiadiazolyl, oxadiazolyl, substituted oxadiazolyl, pyridyl, substituted pyridyl, quinolyl or substituted quinolyl;

m is 1 or 2;

when m is 1, L is $L^1$ or when m is 2, L is $L^2$; and s is 0 or an integer ranging from about 1 to about 8.

37. The composition of claim 36, wherein the thermoplastic is selected from the group consisting of polystyrenes, polyesters, polyamides, polymethacrylates, polyolefins, polycarbonates, acrylonitrile-butadiene styrenes, and acrylics.

38. The composition of claim 37, wherein the thermoplastic is a polyester.

39. The composition of claim 38, wherein the polyester is polyethylene terephthalate.

* * * * *